US009420100B2

(12) United States Patent
Bellini et al.

(10) Patent No.: US 9,420,100 B2
(45) Date of Patent: Aug. 16, 2016

(54) NEXT BEST ACTION METHOD AND SYSTEM

(71) Applicants: Davide Guglielmo Bellini, Milan (IT); Matteo Maga, Milan (IT); Danilo Rizzo, Milan (IT)

(72) Inventors: Davide Guglielmo Bellini, Milan (IT); Matteo Maga, Milan (IT); Danilo Rizzo, Milan (IT)

(73) Assignee: Accenture Global Services Limited, Dublin (IE)

(*) Notice: Subject to any disclaimer, the term of this patent is extended or adjusted under 35 U.S.C. 154(b) by 98 days.

(21) Appl. No.: 13/952,224

(22) Filed: Jul. 26, 2013

(65) Prior Publication Data

US 2015/0030151 A1  Jan. 29, 2015

(51) Int. Cl.
*H04M 3/51* (2006.01)
(52) U.S. Cl.
CPC .................. *H04M 3/5175* (2013.01)
(58) Field of Classification Search
CPC .............. G06Q 30/0207; G06Q 30/02; G06Q 30/0211; G06Q 30/0243; G06Q 30/0242; G06Q 10/06316; G06Q 10/0633; G06Q 30/0201; G06Q 50/01; G06Q 10/06375; G06Q 10/06; G06Q 10/06393; G06Q 10/06398; G06Q 10/063; H04M 3/5175; H04M 3/523; H04M 3/5191
USPC ............. 379/265.01–265.02, 265.05–265.06; 705/14.1, 14.13, 14.42, 7.26–7.29, 705/7.37–7.39
See application file for complete search history.

(56) References Cited

U.S. PATENT DOCUMENTS

| | | | |
|---|---|---|---|
| 6,012,058 A | 1/2000 | Fayyad et al. | |
| 6,049,599 A | 4/2000 | McCausland et al. | |
| 6,449,612 B1 | 9/2002 | Bradley et al. | |
| 6,470,335 B1 | 10/2002 | Marusak | |
| 6,542,881 B1 | 4/2003 | Meidan et al. | |
| 6,675,164 B2 | 1/2004 | Kamath et al. | |
| 6,728,728 B2 | 4/2004 | Spiegler et al. | |
| 6,836,773 B2 | 12/2004 | Tamayo et al. | |
| 7,698,163 B2 | 4/2010 | Reed et al. | |
| 2002/0165755 A1 | 11/2002 | Kitts | |
| 2003/0200135 A1 | 10/2003 | Wright | |
| 2003/0208468 A1 | 11/2003 | McNab et al. | |

(Continued)

FOREIGN PATENT DOCUMENTS

| | | |
|---|---|---|
| EP | 1 168 198 | 1/2002 |
| WO | WO 01/22265 | 3/2001 |
| WO | WO 01/29692 A2 | 4/2001 |

OTHER PUBLICATIONS

Kleissner, C., "Data Mining for the Enterprise," Conference on System Sciences Proceedings of the Thirty-First Hawaii International Conference on Kohala Coast, HI, vol. 7, Jan. 6, 1998, pp. 295-304.

(Continued)

*Primary Examiner* — Rasha Al Aubaidi
(74) *Attorney, Agent, or Firm* — Brinks Gilson & Lione

(57) ABSTRACT

The Next Best Action (NBA) management system and method is a real time decision solution usable in multiple industries, including Telco industry. The NBA system identify offers for call agents to pitch to customers, calculate and allow call center organizations and agents to view performance analytics, including an Inbound Campaign Agent Performance Index (ICAPI) for each agent. The NBA system uses usage oriented key performance indicators (KPIs) and sales oriented KPIs to add a weighted portion of the usage oriented KPIs and the sales oriented KPIs to calculate the ICAPI for each agent.

21 Claims, 19 Drawing Sheets

(56) References Cited

U.S. PATENT DOCUMENTS

| | | |
|---|---|---|
| 2004/0034558 A1 | 2/2004 | Eskandari |
| 2004/0039593 A1 | 2/2004 | Eskandari |
| 2004/0073520 A1 | 4/2004 | Eskandari |
| 2005/0154748 A1 | 7/2005 | Kraiss |
| 2005/0203768 A1 | 9/2005 | Florance et al. |
| 2005/0251408 A1 | 11/2005 | Swaminathan et al. |
| 2007/0156673 A1 | 7/2007 | Maga et al. |
| 2007/0185867 A1 | 8/2007 | Maga et al. |
| 2014/0365305 A1* | 12/2014 | Arditi et al. ............ 705/14.58 |

OTHER PUBLICATIONS

Mitchell, Tom M., "Machine Learning and Data Mining," Communications of the Association for Computing Machinery, ACM, New York, NY, vol. 42, No. 11, Nov. 1999, pp. 30-36.

Nadinic, Berislav et al., "New Possibilities for Knowledge Discovery in Telecommunication Companies," Eighth International Conference on Telecommunications, ConTEL 2005, Zagreb, Croatia; Jun. 15-17, 2005, pp. 259-263.

Sampaio , Pedro R. Falcone, et al.: "Business Process Design and Implementation for Customer Segmentation e-Services," Proceedings of the 2005 IEEE International Conference on E-Technology, E-Commerce and E-Service, Eee-05, Hong Kong, China, Mar. 29-Apr. 1, 2005, pp. 228-234, including Table of Contents pp. v-xiv.

Roiger , Richard J. et al., "A Majority Rules Approach to Data Mining," Proceedings of International Conference on Intelligent and Cooperative Information Systems, Copyright 1997, pp. 100-107.

Wikipedia.org, "Next-best-action marketing", pp. 1-3, last modified Sep. 22, 2014, http://en.wikipedia.org/w/index.php?title=Next-bestaction_marketing&oldid=626612318.

* cited by examiner

FIG. 11

NEXT BEST ACTION METHOD AND SYSTEM

TECHNICAL FIELD

The present description relates generally to a system and method, generally referred to as a system, for providing a next best action (NBA) management system, and more particularly, but not exclusively, to identifying offers for call agents to pitch to customers, calculating and allowing call center organizations and agents to view performance analytics, including an Inbound Campaign Agent Performance Index (ICAPI) for each agent.

RELATED ART

Traditionally, organizations identify and/or select a product to pitch to customer then segment customers to identify particular customers more likely to buy the product, and then communicate information about the product to the identified particular customers. In addition, organizations fail to determine effective and efficient ways to identify, collect, measure and improve personnel performance.

SUMMARY

The Next Best Action (NBA) management system identifies offers for call agents to pitch to customers, and calculates performance analytics, including an Inbound Campaign Agent Performance Index (ICAPI) for call center agents by using usage oriented key performance indicators (KPIs) and sales oriented KPIs. The NBA system combines a weighted portion of the usage oriented KPIs and the sales oriented KPIs to calculate the ICAPI for each agent.

The NBA system may include a memory, a processor, a user interface, and processor executable components, including a treatment eligibility component, an offer prioritization component, an agent performance component. The memory may include: key performance indicators (KPIs), including usage oriented KPIs and sales oriented KPIs. The treatment eligibility component causes the processor to determine, based on the usage oriented KPIs, sales oriented KPIs or both, a customer treatment including development treatment, retention treatment, education treatment, next best offer, or some combination thereof. The offer prioritization component causes the processor to: identify a priority score for an offer by calculating a probability of a 'positive' response to the offer multiplied by a projected value for the customer accepting the offer, customer treatment weight or a strategy weight based on a selected strategy for the customer, offer weight used to artificially up-weight or down-weight individual offers, and context weight used to up-weight the offers related with a reason of the customer; and communicate the priority score for the offer to an agent. The agent performance component causes the processor to: receive, into the memory, performance results for the agent used to calculate the Usage oriented KPIs and the Sales oriented KPIs; and calculate an Inbound Campaign Agent Performance Index (ICAPI) for each agent using the Usage oriented KPIs and the Sales oriented KPIs by adding a weighted portion of the Usage oriented KPIs and the Sales oriented KPIs. The user interface displays the ICAPI for an agent as a progression bar on the user interface.

The usage oriented KPIs may include: usage rate percentage equal to a number of NBA interactions divided by a total call center customer calls; Pitching Rate percentage equal to a number of NBA recorded interactions divided by a number of NBA eligible calls; and Handling Efficiency percentage equal to a number of NBA optimal handling time interactions divided by number of NBA total handling time.

The NBA recorded interactions may include the number of NBA calls eligible with at least one customer response; wherein the Sales oriented KPIs include: Negotiation Efficiency percentage equal to the number of NBA recorded interactions divided into a number of accepted offers added to a number of saved offers multiplied by a saved offers coefficient; and Generated Value percentage equal to number of optimal projected sales value target divided by a number of projected sales value.

The next best offer may include education treatment, Churn Prevention treatment and cross sell offers.

The probability of a 'positive' response to an offer may be modified by a Value versus Volume "n" lever that determines whether to place emphasis on Likelihood of acceptance (volume) or financial benefit (value), wherein the processor calculates the probability of a 'positive' response by using adaptive models to calculate propensity for each offer for each customer.

The processor may use an adaptive model per each offer, and the strategy weight determines the customer treatment based on tenure of the customer, and spending of the customer. The projected value for the customer accepting the offer may be equal to [(Future annual revenue per user (ARPU)−Current ARPU)+Monthly Fee]*Estimated Offer Life Time+Activation Cost where Future ARPU=Sum of {[(Last Month Usage−Offer Bundle)*cost out of bundle]} for traffic types impacted by the offer, and Current ARPU=Sum of {Last month Revenue} for traffic types impacted by the offer.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 11 illustrates another example graphical user interface the NBA system may present to the call agent.

DETAILED DESCRIPTION

Figure 1:
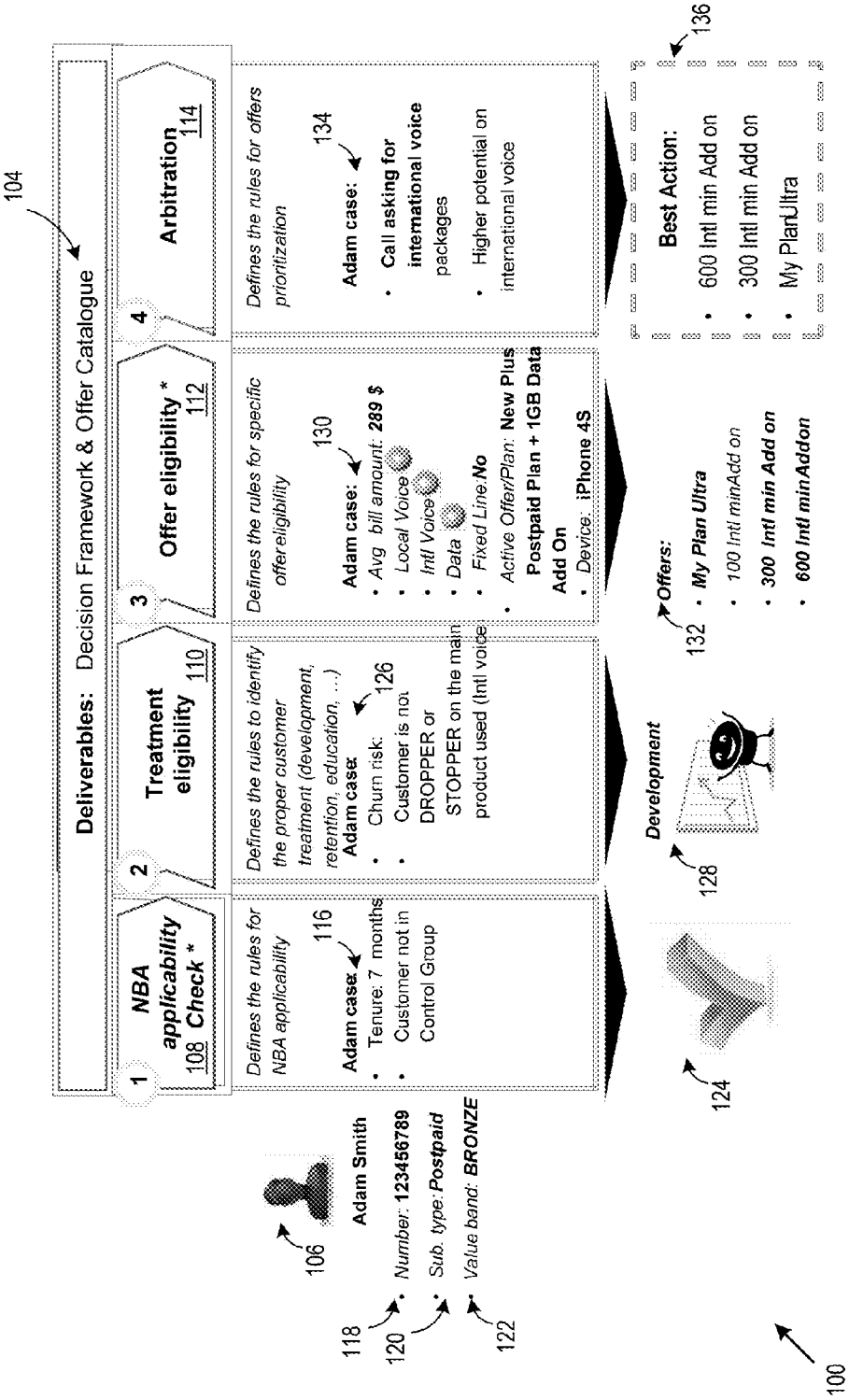
FIG. 1 shows an example decisioning framework the next best action (NBA) may employ to determine eligible offers and prioritization of the offers.

In relation to the following description, components shown in different drawings with the same reference numerals basically perform the same function. The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

A system and method, generally referred to as a Next Best Action (NBA) system, may relate to identifying offers to pitch to customers, and calculating performance analytics. The principles described herein may be embodied in many different forms.

The NBA system provides a real time decision solution that relies on customer insights, business strategies and context-specific information to determine the most suitable action for a specific customer. The Next Best Action (NBA) system provides an automatic process used for extracting customer data from external systems. The NBA system may transform the extracted data in a "flattened" structure used by a real time engine of the NBA system to quickly read information needed to make an informed and/or preferred decision (e.g., a best offer and one or more next best offers). The NBA system refines the business rules used and may identify business rules leveraged based on past experiences in one or more industries. The NBA system real time engine interprets rules by leveraging quick database access techniques to efficiently provide results to the NBA user interface.

The NBA system identifies offers for agents to pitch to customers, and calculates performance analytics, including an Inbound Campaign Agent Performance Index (ICAPI) for call center agents by using usage oriented key performance indicators (KPIs) and sales oriented KPIs. The NBA system combines a weighted portion of the usage oriented KPIs and the sales oriented KPIs to calculate the ICAPI for each agent.

The NBA system may include a memory, a processor, a user interface, and processor executable components, including a treatment eligibility component, an offer prioritization component, an agent performance component. The memory may include: key performance indicators (KPIs), including usage oriented KPIs and sales oriented KPIs. The treatment eligibility component causes the processor to determine, based on the usage oriented KPIs, sales oriented KPIs or both, a customer treatment including development treatment, retention treatment, education treatment, next best offer, or some combination thereof. The offer prioritization component causes the processor to: identify a priority score for an offer by calculating a probability of a 'positive' response to the offer multiplied by a projected value for the customer accepting the offer, customer treatment weight or a strategy weight based on a selected strategy for the customer, offer weight used to artificially up-weight or down-weight individual offers, and context weight used to up-weight the offers related with a reason of the customer; and communicate the priority score for the offer to an agent. The agent performance component causes the processor to: receive, into the memory, performance results for the agent used to calculate the Usage oriented KPIs and the Sales oriented KPIs; and calculate an Inbound Campaign Agent Performance Index (ICAPI) for each agent using the Usage oriented KPIs and the Sales oriented KPIs by adding a weighted portion of the Usage oriented KPIs and the Sales oriented KPIs. The user interface displays the ICAPI for an agent as a progression bar on the user interface.

The usage oriented KPIs may include: usage rate percentage equal to a number of NBA interactions divided by a total call center customer calls; Pitching Rate percentage equal to a number of NBA recorded interactions divided by a number of NBA eligible calls; and Handling Efficiency percentage equal to a number of NBA optimal handling time interactions divided by number of NBA total handling time.

The NBA recorded interactions may include the number of NBA calls eligible with at least one customer response; wherein the Sales oriented KPIs include: Negotiation Efficiency percentage equal to the number of NBA recorded interactions divided into a number of accepted offers added to a number of saved offers multiplied by a saved offers coefficient; and Generated Value percentage equal to number of optimal projected sales value target divided by a number of projected sales value.

The next best offer may include education treatment, Churn Prevention treatment and cross sell offers.

The probability of a 'positive' response to an offer may be modified by a Value versus Volume "n" lever that determines whether to place emphasis on Likelihood of acceptance (volume) or financial benefit (value), wherein the processor calculates the probability of a 'positive' response by using adaptive models to calculate propensity for each offer for each customer.

The processor may use an adaptive model per each offer, and the strategy weight determines the customer treatment based on tenure of the customer, and spending of the customer. The projected value for the customer accepting the offer may be equal to [(Future annual revenue per user (ARPU)−Current ARPU)+Monthly Fee]*Estimated Offer Life Time+Activation Cost where Future ARPU=Sum of {[(Last Month Usage−Offer Bundle)*cost out of bundle]} for traffic types impacted by the offer, and Current ARPU=Sum of {Last month Revenue} for traffic types impacted by the offer.

FIG. 1 shows an example decisioning framework 100 the next best action (NBA) system 102 ("the NBA") may employ to determine eligible offers and prioritization of the offers. The NBA system 102 may use the decisioning framework 100 to generate an offer catalogue 104 by determining the eligibility of a customer 106 to receive particular offers and one or more prioritizations of the eligible offers to pitch to the customer. The NBA decisioning framework may include a methodology used to define a set of rules to determine the eligible offers to pitch to a customer and one or more prioritizations to order the eligible offers to pitch to the customer. The NBA system 102 identifies customers 106, determines where and how each customer 106 is positioned in the customer's lifecycle and channels (e.g., products and services lifecycles and channels), determines one or more strategies to use to identify, prioritize and pitch offers of products and services. The strategies used by the NBA system 102 may be connected to the one or more lifecycles and channels of the customer, and determines one or more estimated times (e.g., where in the lifecycle of a product and/or a service) to pitch offers to the customer.

The NBA system 102 employs one or more strategies (e.g., rules and protocols) for each stage of the NBA framework including the stages of 1) 'check' 108 which defines rules for NBA applicability, 2) 'treatment eligibility' 110 which defines rules to identify one or more preferred customer treatments (e.g., development, retention, education . . . etc.), 3) 'offer eligibility' 112 which defines the rules for particular offers and 4) 'arbitration' 114 which defines rules for prioritizing offer.

The NBA 102 performs the check 108 for the applicability of the NBA for a customer and whether to pitch offers to a customer 106. For example, the NBA 102 may use multiple inputs to determine the applicability of the NBA and whether to pitch offers to a customer 106, including customer profile information 116 such as the tenure of the customer and whether a customer is in a control group. The NBA system 102 may identify customers for one or more control groups used by the NBA to train (e.g., improve) adaptive models used by the NBA system 102 to forecast and refine the performance of one or more strategies (e.g., rules and protocols) for each stage of the NBA framework. The NBA 102 may identify each customer 106 by a customer identifier 118, the type and sub-type 120 of products and or services for one or more accounts of each customer, including a value brand 122 (e.g., bronze, silver, gold, platinum) identified for the customer that identifies a range of revenue from the customer realized or forecasted for the service provider. The NBA 102 communicates the results (e.g., an applicability indicator 124) of the check 108 to the call center agent in real-time (e.g., when the customer initially calls and/or contacts a call center agent).

The NBA 102 determines the 'treatment eligibility' 110 based on one or more factors including customer profile information 126 such as calculated customer churn risk, whether the reason the customer is contacting the call agent to and/or has dropped, cancelled or stopped a main product or service (e.g., international voice service). The NBA 102 communicates the customer treatment 128 (e.g., development, retention, education . . . etc.) to the call center agent in real-time.

The NBA 102 determines the 'offer eligibility' 112 of one or more offers to pitch to the customer based on one or more factors including customer profile information 130 such as: the average bill amount; services and products for the customer account such as local voice, international voice, data plan and fixed line; whether the customer has an active offer and/or plan; and add-ons such as a device. The NBA 102 communicates to the call center agent in real-time the eligible offers 132 (e.g., 100 international minutes add-on, 300 international minutes add-on, 600 international minutes add-on) to pitch to the customer 106.

The NBA 102 determines an arbitration 114 (e.g., prioritization of eligible offers) strategy that may be based on one or more factors including customer profile information 130 such as whether the customer contacted the service provider about international voice packages, and whether the NBA 102 has identified one or more applicable international voice packages as eligible offers and/or whether the one or more applicable international voice packages provide the service provider higher potential revenue. The NBA 102 communicates to the call center agent in real-time the best action 136 (e.g., prioritized eligible offers to pitch to the customer such as 600 international minutes add-on, 300 international minutes add-on and/or my plan ultra).

Figure 2:
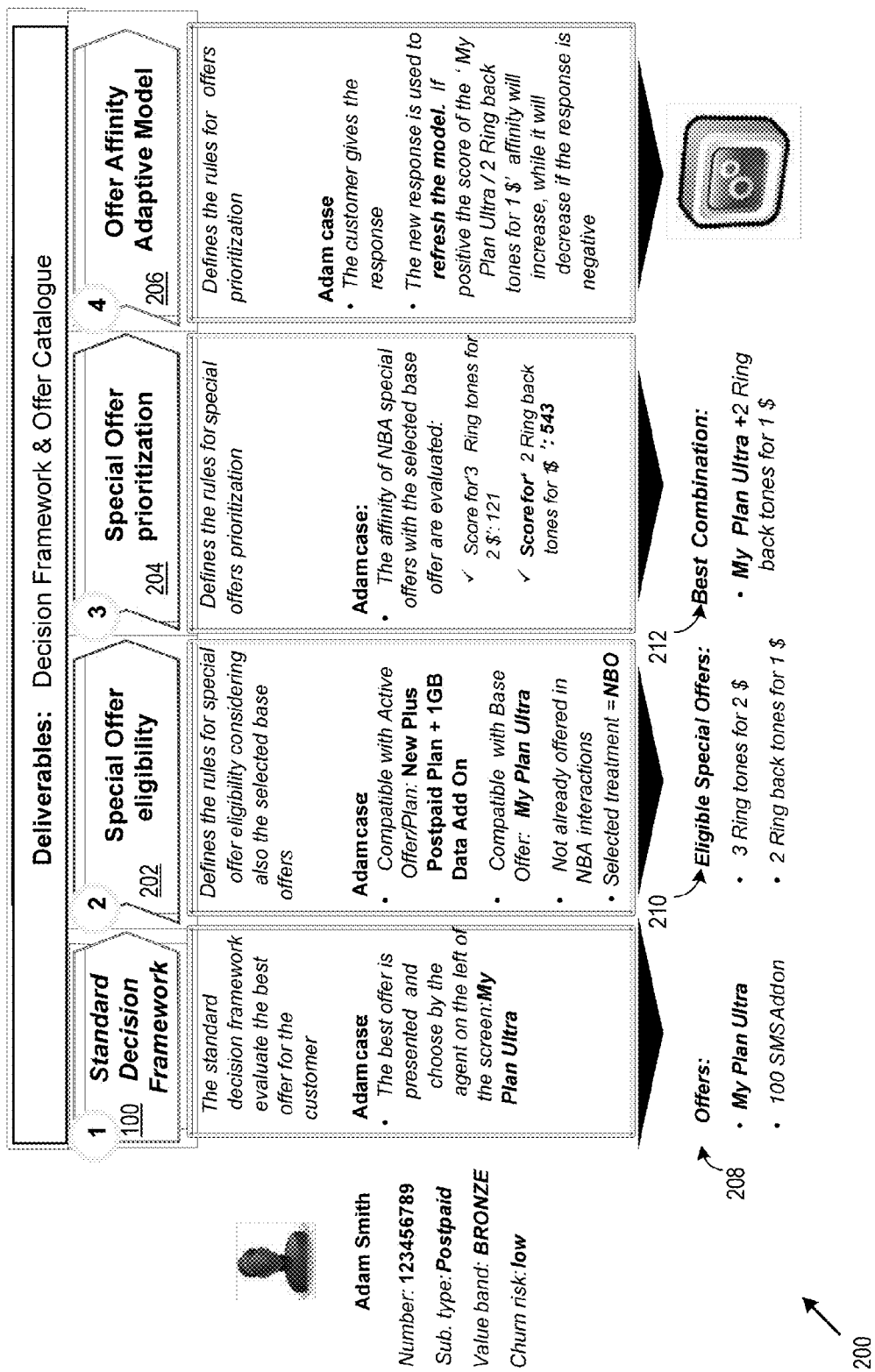
FIG. 2 shows an example decisioning framework the next best action may employ to determine special offers.

FIG. 2 shows an example decisioning framework 200 the NBA system 102 may employ to determine special offers to pitch to each customer 106. The decisioning framework 200 may include the stages of 1) performing the standard decision framework 100 to determine one or more best offers 136 to pitch to the customer 106, 2) special offer eligibility 202 defines rules for special offer eligibility considering selected base offers 136, 3) special offer prioritization 204 defines rules for special offers prioritization, and 4) offer affinity adaptive model 206 (e.g., compatibility adaptive model) defines rules for prioritizing offers.

The NBA 102 defines special offers as cross sell/VAS (value added service—A value-added service (VAS) may be one or more non-core services such as offers presented bundled with base offers. The NBA 102 proposes (e.g., communicates by prompting the agent) special offers when the NBA determines an applicable NBO treatment to apply and the special offers presented (e.g., on the right part of the NBA offer screen) to the call agent to consider pitching to the customer. Decision framework for special offers defines the rules determining one or more combination of special offers and base offers to pitch to each customer. The NBA 102 uses offer affinity ("Customers Who Bought This Item Also Bought" criteria) or marketing boost. The NBA 102 may configure one or more special offers in the offer catalogue as base offers used as cross sell services or content VAS.

For example, the NBA 102 may perform the stages of the standard decision framework 100 to determine one or more best offers 208 (e.g., base offers) to pitch to the customer 106. The call agent may present the one or more best offers 136, and the call agent may indicate (e.g., record) the preference of the customer for the offer. The call agent may select an indicator on a NBA user interface, where the selectable preference of the customer for the offer may include accept, decline, and hold offer for customer consideration.

The NBA 102 identifies one or more eligible special offers 210 (e.g., 3 ring tones for $2.00, and/or 2 ring back tones for $1.00) selected base offers 136. The NBA may determine the eligibility of special offers based on the compatibility of each special offer with one or more active offers and/or plans (e.g., new plus postpaid plan with 1 Gigabytes (GB) data add-on, compatible with base offer). The NBA may determine the eligibility of special offers based on whether the call agent already pitched to the customer the product or service identified by a special offer, and the selected customer treatment 128 (e.g., development, retention, education . . . etc.).

The NBA 102 calculates one or more prioritizations for the special offers 210 to identify one or more best combinations 212 of services and products (e.g., active plans, base offers 136, special offers 210 . . . etc.) for the customer. For example, the NBA 102 may identify one or more best combinations 212 of services and products to pitch to the customer by forecasting the preferences (e.g., compatibility and/or affinity) of a customer for a special offer in combination with a selected base offer 208, and scoring each combination based on one or more factors (e.g., costs and savings) for the customer and/or the service provider to determine a best combination, and/or one or more prioritizations for the combination of offers. For example, the NBA 102 may use the scoring to determine a best combination 212 of services and products for the customer to include "my plan ultra" with 2 ring back tones for $1.00.

The NBA 102 trains (e.g., refines) one or more affinity adaptive models 206 used to calculate the base offers (136, 208) and special offer prioritizations based on one or more responses from the customer to an offer by the call agent. The response by the customer may be used by the NBA system to refresh the one or more affinity adaptive models 206. For example, when a call agent receives positive.

Figure 3:
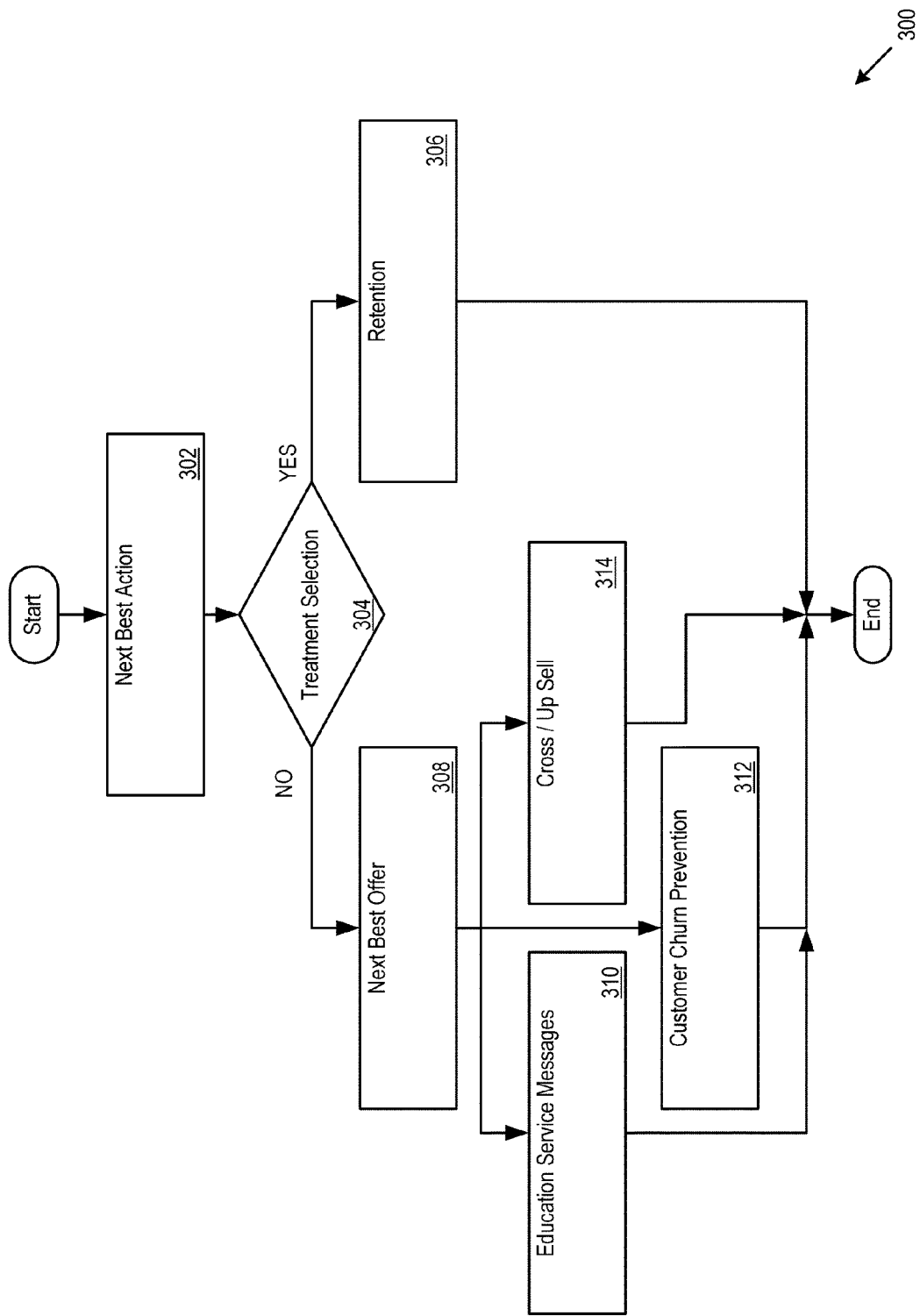
FIG. 3 shows example logic flow that the NBA system may execute to determine a next best offer (NBO) prioritization.

FIG. 3 shows example logic flow 300 that the NBA system may execute to determine a next best offer (NBO) prioritization. The NBA system 102 may include processor executable instructions that determine the applicability of pitching an offer to the customer (302), and the eligibility of the customer to receive one or more particular treatments (e.g., development, retention, education . . . etc.) (304). Education, development and retention represent the three customer stages of the customer's lifecycle. The NBA system considers Education the initial state of the customer where a merchant (e.g., service provide) communicates with new customers (e.g., new customers to a product, existing customers learning a new product and/or service) building a relationship with the new customers so that the new customers continue to return, interact, and purchase. The NBA system considers Development the intermediate phase where the NBA system considers customers in the Development state likely to purchase products and/or engage with the merchant (e.g., service provide) brand and/or digital presence (e.g., service provide website). The NBA system considers Retention a state where the customer may eventually lose interest or contact with the company (e.g., service provide) and the customer may be considering leaving. The NBA system 102 determines the treatment selection to use for the offers. For example, the NBA system 102 may identify whether a customer is entitled to one or more treatments (304) such as: retention (306) of an offer and/or a NBO (308) pitch by the call agent.

The NBA system 102 may determine the treatment selection based on particular KPIs stored in the NBA database which may be connected to a network (e.g., the Internet) and in communications with one or more processors. The processor executable instructions implement one or more configurable decision rules for the NBA system.

For example, the NBA system 102 may perform a retention treatment when the processor executable instructions determine the customer profile information (e.g., 118, 120, 122, 116, 126, 130, 134) includes a churn score greater than 7 (out of a score of 10), and during the last two months (e.g., usage in any service line is zero, no usage or some limited use), the customer has not used an active product and/or service from the service provider. Alternatively, the NBA system 102 may perform a retention treatment when the call agent selects a retention call reason including: port out request, or number portability, and perform the retention.

When the processor executable instructions do not determine to apply a retention treatment, the processor executable instructions performs the next best offer treatment. When the processor executable instructions determines to apply the next best offer treatment, the customer is eligible for other treatments (e.g., education 310, churn prevention 312 and cross sell offers 314). The education 310 treatment may include providing education service messages to assist the customer in how to use active products and/or services in the plan of the customer. The churn prevention 312 treatment may include providing one or more options to the customer, where the options include information, services and/or products determined by the NBA system to be responsive to preventing churn of the customer.

Table 1 shows an example next best offer (NBO) prioritization formula the NBA system may use to respond to real-time contextual information collected during a customer interaction (e.g., a phone call from a customer about a service and/or product). The NBA system calculates the likelihood that the chance of the call agent receiving a 'positive' response from the customer to the offer proposal (0< >1) and 'n' is the offer value divided by volume lever (range: 0-2). The NBA system may calculate the offer value as the estimated (e.g., projected) value (e.g., revenue and/or savings) to the company (e.g., service provider) for an acceptance of an offer by the customer. The offer value may be automatically communicated (e.g., real-time) to the NBA system from an accounting system and/or financial system of the service provider. The NBA system may calculate and use the strategy weight as a lever based on the selected strategy for the customer. The NBA system may calculate the offer weight to artificially up-weight or down-weight one or more offers based on the compatibility and/or relevance of the offer in view of the active plans of the customer and active offers. The NBA system may calculate the context weight to up-weight the offers related with the reason for the customer call. The NBA system may use a default strategy weight, offer weight and/or context weight of 1 to reflect a neutral or non-influencing factor on the priority score.

Based on the treatment selected by the NBA system, the NBA system applies different weights in the prioritization formula, as shown in Table 1.

TABLE 1

Next Best Offer (NBO) prioritization

Priority Score = Likelihood$^n$ x (offer value x Strategy Weight) x Offer Weight x Context Weight The NBA system may prioritize retention of offers based on the likelihood calculation. The NBA system determines eligible offers to pitch to the customer calculated to have a configurable likelihood of acceptance by the customer. The NBA system may calculate the priority score to be equal to the likelihood of a 'positive' outcome (0< >1).

The NBA system may determine a revenue dilution of retention offers (e.g., how much in economic benefit to the service provider versus how likely a customer is to leave the service provider) that identifies whether to perform retention treatment or another treatment. The NBA system may use individual offer eligibility rules (e.g., certain customers may be eligible for a certain level of revenue dilution based upon value and likelihood to churn) to determine treatment selections and/or the prioritization of offers to pitch to the customer.

The NBA system calculates, for each offer, the likelihood of acceptance of an offer by a customer using one or more adaptive models. The NBA system may use one or more adaptive models for each offer.

The NBA system may weight offers up or down in order to align the NBA system with one or more strategies (e.g., a local commercial strategy) and priorities (e.g., local commercial priorities and/or local commercial strategy may be strategies deployed to push one or more particular offers during a scheduled time or time period). For example, the NBA system may weight offers to support product sales targets and/or imperatives. The NBA may apply a multiplication factor to the prioritization score using the weighted offers. The NBA may weight offers up or down to responsively adapt offers to different customers, because identical offers pitched to different customers may not provide the same benefit (e.g., economic benefit) to the customers. The NBA may apply one or more offer weights to an offer and maintain the offer weights in an offer catalogue. The NBA may use the offer weights as levers (e.g., a numeric value with a range of 0 to infinity) in recognition of the relevance of offers for respective customers. The NBA may use a range of 0.5 to 2.0 to affect an offer score in a range that is between half and double the starting score. The NBA may use an offer weight starting value of 1 for each offer.

The NBA system may use criteria to calculate and/or evaluate the best treatment to apply for a customer. For example, when a customer has tenure of less than three months, an education treatment may be selected to educate the customer about the products and/or services under the active plan of the customer. When customer spending is determined by the NBA system to increase by more than a configurable amount (e.g., 50%) of the last month compared to a configurable average period of time (e.g., three months), the NBA system may use a churn prevention treatment calculated to prevent churning the customer. In other cases (e.g., all or some other cases), the NBA system may apply an up/cross sell treatment. The NBA system, for example, may set the strategy weight to 1.5 for a selected offer group (e.g., a group of offers a provider desires to strategically pitch to customers) and for other offer groups, the NBA system may set the strategy weight to 1.

The NBA system calculates and/or receives from accounting and/or financial systems commercial offers value for an offer as a "real" value (e.g., "real" value to the Company—service provider). The NBA system maintains the commercial offers value in the offer catalogue for use in determining decisions in the processor executable instructions.

The NBA system may valuate arbitrated offers: for non-commercial offers (e.g. education treatment) a standard value may be set in the offer catalogue to represent the added value in terms of customer loyalty.

Table 2 shows a commercial offers (e.g. up-sell, cross-sell) value calculation.

TABLE 2

Commercial Offers Value Calculation

Commercial Offers Value = [(Future ARPU − Current ARPU) + Monthly Fee] *
Estimated Offer Life Time + Activation Cost.
where Future ARPU = Sum of {[(Last Month Usage − Offer Bundle)* cost out of bundle]}
for all the type of traffic impacted by the offer.
Current ARPU = Sum of {Last month Revenue}
for all the type of traffic impacted by the offer value versus volume lever.

The commercial offers value versus volume "n" lever allows greater or lesser emphasis to be placed on the likelihood of acceptance (volume) or financial benefit (e.g., value to the service provider). When the NBA system calculates the value of 'n' to be below 1.0 (e.g., between 0.0 and 0.99), the NBA system places greater emphasis on the value in the prioritization algorithm, where a value of 0 (zero) removes the impact of P in the prioritization. When the NBA system determines the value of 'n' to be greater than 1.0, the NBA system places increased emphasis on the likelihood (e.g., acceptance rate). The NBA system prioritizes higher likelihood offers with a resulting increase in the volume of accepted offers. In order to take into account a value of 'n', the NBA system calculates the value of as shown in Table 3.

TABLE 3

Offers Value versus Volume "n" lever n = (churn score/10) + n *(offer catalogue).

The commercial offers value versus volume "n" lever covers offers and the NBA system includes the value of 'n' in the offer catalogue. The NBA system may set the default value of 'n' to 1. Context Weight Allows offers to be up/down weighted to align the top offers with the reason of the customer call. This lever is a numeric value with a range of 0 to infinity. Default value is 1 if no up/down weight is needed.

Figure 4:
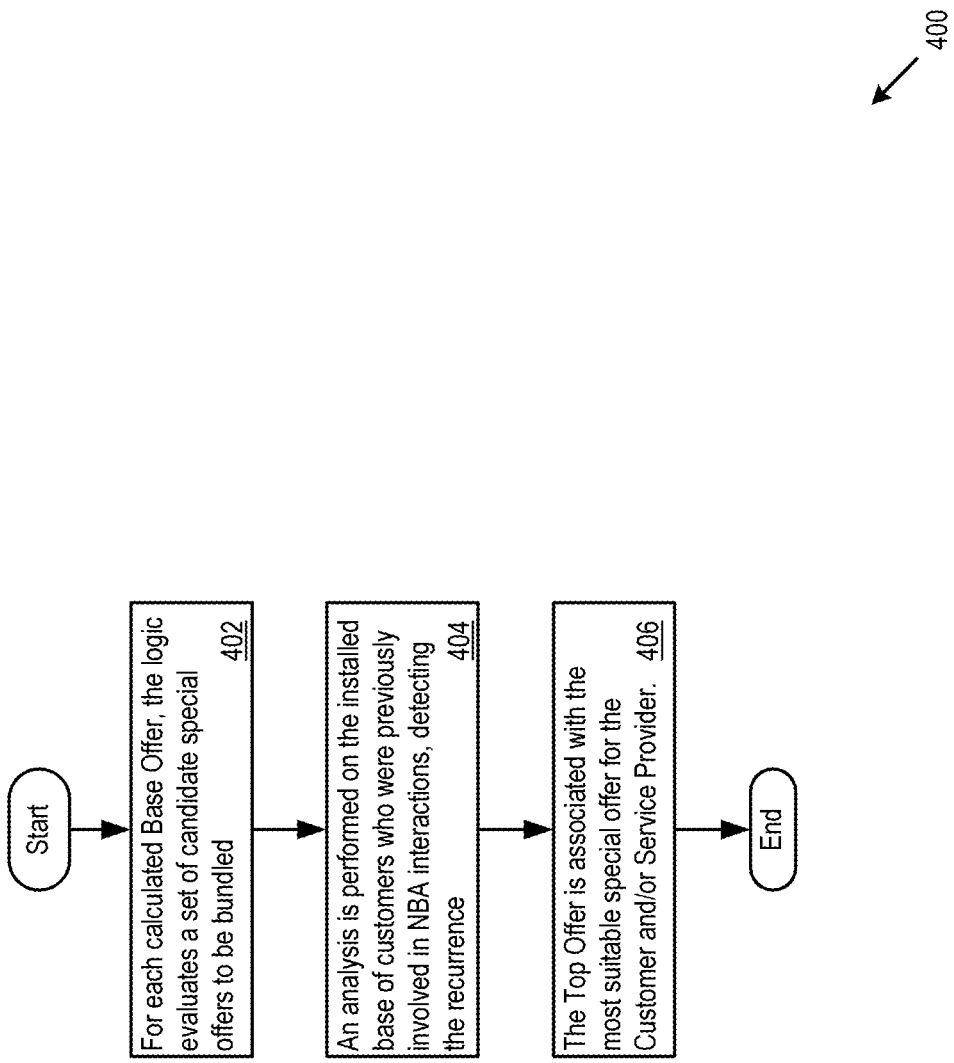
FIG. 4 shows example logic flow that the NBA system may execute to prioritize special offers.

FIG. 4 shows example logic flow 400 that the NBA system may execute to prioritize special offers. The NBA system may prioritize offers based on a combination of "Customers Who Bought This Item Also Bought" criteria and marketing boost. For each calculated base offer, the NBA system may evaluate a set of candidate special offers to be considered for bundling in combinations (402). The NBA system may determine special offers using non-standard eligibility rules. The NBA system may apply soft-eligibility criteria for special offers, except the NBA system may not present special offers in the following conditions: 1) when a special offer is not compatible with the current tariff plan or with an installed service and/or promotion of the customer; 2) when the base offer is not compatible with the associated base offer; and 3) when the customer declines an offer re-proposition within a pre-configurable time interval. The NBA system may implement soft-eligibility criteria such as, designating a customer soft-eligible when the customer has received a bill (e.g., invoice for new service) although the soft-eligible customer has not paid the bill yet which may otherwise disqualify the customer from eligibility. In one implementation, the NBA system allows the customer to be designated soft-eligible for a configurable period of time before disqualifying the customer from soft-eligible (e.g., require invoice for new service to be paid within 30 days of date of initial service deployment).

The NBA system may analyze the installed base of customers who were previously involved in NBA interactions (e.g., interactions between call agents and customers captured by the call agent, by the call agent selecting options on the NBA system user interface), and detect the recurrence of customers, actual and forecasted interactions and related metrics for the NBA interactions (404). The NBA system may prioritize eligible special offers based on the affinity (e.g., compatibility and/or suitability) of the eligible special offers with the associated base offer. The NBA system may calculate the affinity (e.g., compatibility and/or suitability) of the eligible special offers by analyzing the recurrence frequency of the combination base offer and special offer and/or by analyzing the installed base of NBA customers.

The NBA system may associate the top offer with the most suitable special offer for the customer and/or service provider (406). The NBA system may use a classifier to calculate a score for each combination of base offer and special offer. The NBA system may maintain a database NBA table with the various combinations of NBA offers identified by the NBA system. The NBA system may define the NBA table to include N×N records, where N is the number of NBA offers available to offer customers. The NBA system evaluates the affinity (e.g., suitability of the eligible special offers) of each combination base offer/special offer against the installed product of the customer base (initial load). The NBA system may refresh one or more adaptive models based on the acceptance/decline rate of each combination base offer/special offer identified by the NBA system, but exclude from consideration one or more installed products and/or services. The special offers are prioritized using the output of the classifier for the selected combination and the marketing boost The NBA system may define marketing boost for each offer in the offer catalogue and the NBA system may use a marketing boost value in the range of 0.5 to 2.0. The NBA system may use a final priority score formula as shown in Table 4.

TABLE 4

Final Priority Score Formula

Priority Score = Normalized Offer Affinity x Offer Weight

In addition to the NBA system providing a way to identify the eligible offers to pitch to a customer and one or more prioritizations to order the eligible offers to pitch to the customer, the NBA system provides call agents performance metrics, including an inbound campaign agent performance index (ICAPI). The NBA system calculates the metrics for the key performance indicators and context of the call agent and customer interactions. For example, when a call agent selects an option, the NBA system records the interaction and the data necessary to calculate the metrics. The NBA system calculates the call agent performances summarized by the ICAPI. The NBA system calculates the ICAPI by combining multiple defined KPIs. The ICAPI indicates how the call agent is progressing towards one or more performance targets. The NBA system uses coefficients to properly weight each index in the final calculations. The default values for each one is shown below: more weight is given to the value creation rather than to the volumes.

The NBA system captures in real-time the metrics (e.g., data) to calculate the inbound campaign agent performance index (ICAPI), including the time an offer is pitched, and when an offer is eventually accepted by the customer, the time of acceptance of the pitch at the later time, where the time of acceptance of the pitch may be after the call with the call agent. The NBA system captures in real-time the metrics to calculate KPIs for each offer and measure call agent performance.

The system and method may include calculating a metric that measures the effectiveness of an initial pitch of an offer made by an agent to a customer based on the time an offer is saved and the time of acceptance by the customer, which may be some time after the initial pitch and following the call. The system and method may include calculating a metric that measures the effectiveness of an initial pitch of an offer made by an agent to a customer and subsequent pitches by the initial agent or other agents based on the time the initial offer is saved and the time of acceptance by the customer, which may be some time after the initial pitch and following the call.

Table 5 shows example inbound campaign agent performance index (ICAPI).

TABLE 5

Inbound Campaign Agent Performance Index (ICAPI)

ICAPI = a ∗ Usage Rate % + b ∗ Pitching Rate % + c ∗ Handling Efficiency % + d ∗ Negotiation Efficiency % + e ∗ Generated Value %

Table 6 shows example call agent key performance indicators.

TABLE 6

Agent KPIs

| | |
|---|---|
| Usage Rate % | $\dfrac{\text{NBA interactions}}{\text{Total CCC calls}}$ |
| Pricing Rate % | $\dfrac{\text{NBA recorded interactions}}{\text{NBA eligible calls}}$ |
| Handling Efficiency % | $\dfrac{\text{NBA optimal handling time}}{\text{NBA total handling time}}$ |
| Negotiations Efficiency % | $\dfrac{\text{Accepted offers} + k * \text{Saved offers}}{\text{NBA recorded interactions}}$ |
| Generate Value % | $\dfrac{\text{Projected Sales Value}}{\text{Optimal Projected Sales value target}}$ |

Table 7 shows example default values for coefficients the NBA system may use to properly weight each index into the final calculations. The NBA system may set each coefficient with more weight to emphasize the value creation (e.g., financial benefit to the service provider) over the volume (e.g., likelihood of acceptance).

TABLE 7

NBA default coefficients

| Coefficient | Weight |
|---|---|
| a | 0.05 |
| b | 0.10 |
| c | 0.15 |
| d | 0.30 |
| e | 0.40 |

Figure 5:
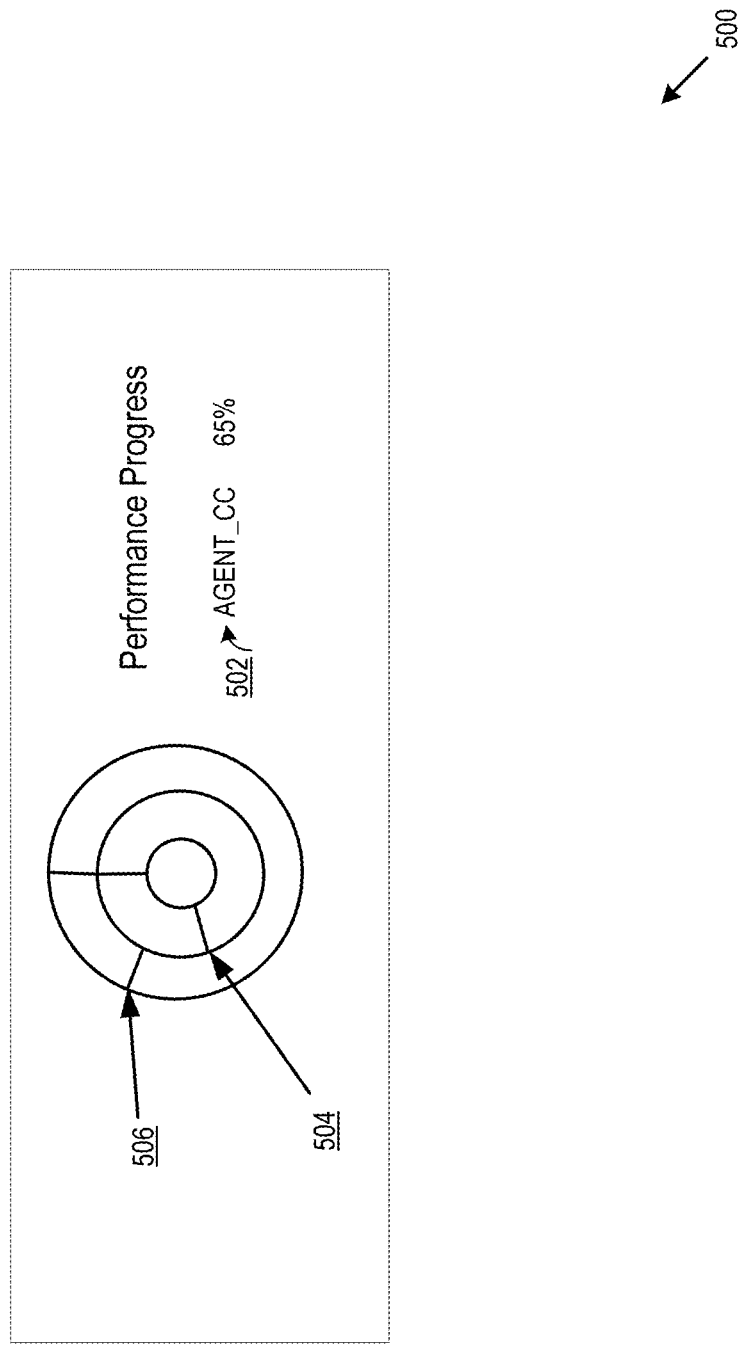
FIG. 5 illustrates an example progression bar the NBA system may display to the call agent.

FIG. 5 illustrates an example progression bar 500 the NBA system may display to the call agent. The progression bar 500 provides the call agent a real-time visual feedback regarding the performance of the call agent (e.g., a graphical representation of a target performance and actual performance in the form of concentric lanes that indicate the respective values where 100 percent is represented by 360 degrees). The NBA system calculates the performance progression value (e.g., actual progress) 502 and displays the performance progression value 502 as progression bar progress indicator 504 compared to the target performance indicator 506 on the NBA user interface (e.g., displayed on the upper part of NBA user interface). The concentric lanes (e.g., each lane for the target performance and the actual performance, respectively) may be different colors that indicate the target performance and the actual performance.

Table 8 shows an example use of different coefficients group based on the NBA stages.

TABLE 8

Compare Different coefficients group based on NBA stage

| Metrics | Agent 1 | Agent 2 |
|---|---|---|
| Total CCC Calls | 1010 | 1000 |
| NBA Interactions | 820 | 430 |
| NBA Eligible Calls | 600 | 398 |
| NBA Recorded Interactions | 520 | 300 |
| Accepted Offers | 90 | 120 |
| Saved Offers | 20 | 70 |
| Total Amount of Generated Value by Agent Sales | 1200 | 2000 |
| Optimal Sales Value Target | 6000 | 4000 |
| NBA Total Handling Time | 100000 | 82000 |
| NBA Optimal Handling Time | 93600 | 54000 |

Table 9 shows an example compare of KPIs for multiple call agents.

TABLE 9

Compare KPIs for Multiple Call Agents

| Key Performance Indicators (KPI) | Agent 1 | Agent 2 | Target |
|---|---|---|---|
| Usage Rate | 81.19% | 43.00% | 80% |
| Pitching Rate | 86.67% | 75.38% | 80% |
| Handling Efficiency | 93.60% | 65.85% | 80% |
| Negotiation Efficiency | 18.27% | 45.83% | 40% |
| Generated Value Ration | 20.00% | 50.00% | 30% |

Table 10 shows an example compare of ICAPIs for multiple Call agents. Table 10 shows that agent 1 did not reach the ICAPI target even if the usage KPIs were high because was poor in selling and generating value. Agent 2 reached the ICAPI target because he exceeded the sales target even if he used the NBA tool less than the expected. Agent 2 reached the ICAPI target because he exceeded the sales target even if he used the NBA tool less than the expected.

TABLE 10

Compare ICAPIs for Multiple Call Agents

| Index | Agent 1 | Agent 2 | Target |
|---|---|---|---|
| ICAPI | 40.25% | 53.32% | 48.00% |

Table 11 shows a glossary of terms as used by the NBA system.

TABLE 11

| Glossary | |
|---|---|
| Term | Definition |
| NBA Interactions | Total number of NBA calls including not eligible and eligible customers with or without tracked response for the offers |
| Total CCC Calls | Total number of call handled by the agent |

TABLE 11-continued

| Glossary | |
|---|---|
| Term | Definition |
| NBA recorded interactions | Total number of eligible NBA calls with at least one customer response |
| NBA eligible calls | Total number of NBA calls with at least one eligible offer with or without tracked response |
| NBA total handling time | Cumulative time (in seconds) spent for NBA recorded interactions |
| NBA optimal handling time | Calculated as: Optimal Handling Time per Interaction * Time Agent Factor * NBA eligible calls<br>Optimal Handling Time per Interaction is set by default to 180 seconds and can be scaled by a Agent Time Factor in order to take into account different handling time for different agent types (e.g. Retail = 3, CSR = 1, CSR Supervisor = 0.8 etc.) |
| Accepted offers | Total number of time that the agent assigned an offer to accepted status |
| k * Saved offers | Total number of saved offer. The factor k is used to give less weight to saved offers compared to accepted. Default value of k is 0.25 |
| Projected Sales Value | Sum of the projected values of accepted offers during the day related to a specific agent |
| Optimal Projected Sales Value target | Calculated as: (Sum of the projected value of top 3 offers for customers with an accepted interaction during the day) * Agent Value Factor<br>Agent Value Factor is used to set different performance for different agent types (e.g. Retail = 1, CSR in Complain queue = 0.5, CSR Supervisor = 0.7 etc.) |
| Usage Rate | % of Total number of NBA calls over the total number of received calls by agent |
| Pitching Rate | % of NBA recorded interaction over the total number of eligible calls |
| Handling Efficiency | Synthesizes the agent performance in terms of time spent per interaction |
| Negotiation Efficiency | Synthesizes the negotiation performance of the agent taking into account the number of negotiations with a non-negative outcome (accepted and saved). It supports a multi channel configuration (e.g. in case an offer is saved by a call center agent and accepted by a retail, both of them are rewarded) |
| Generated Value Ratio | Sales efficiency of the Agent |

Figure 6:
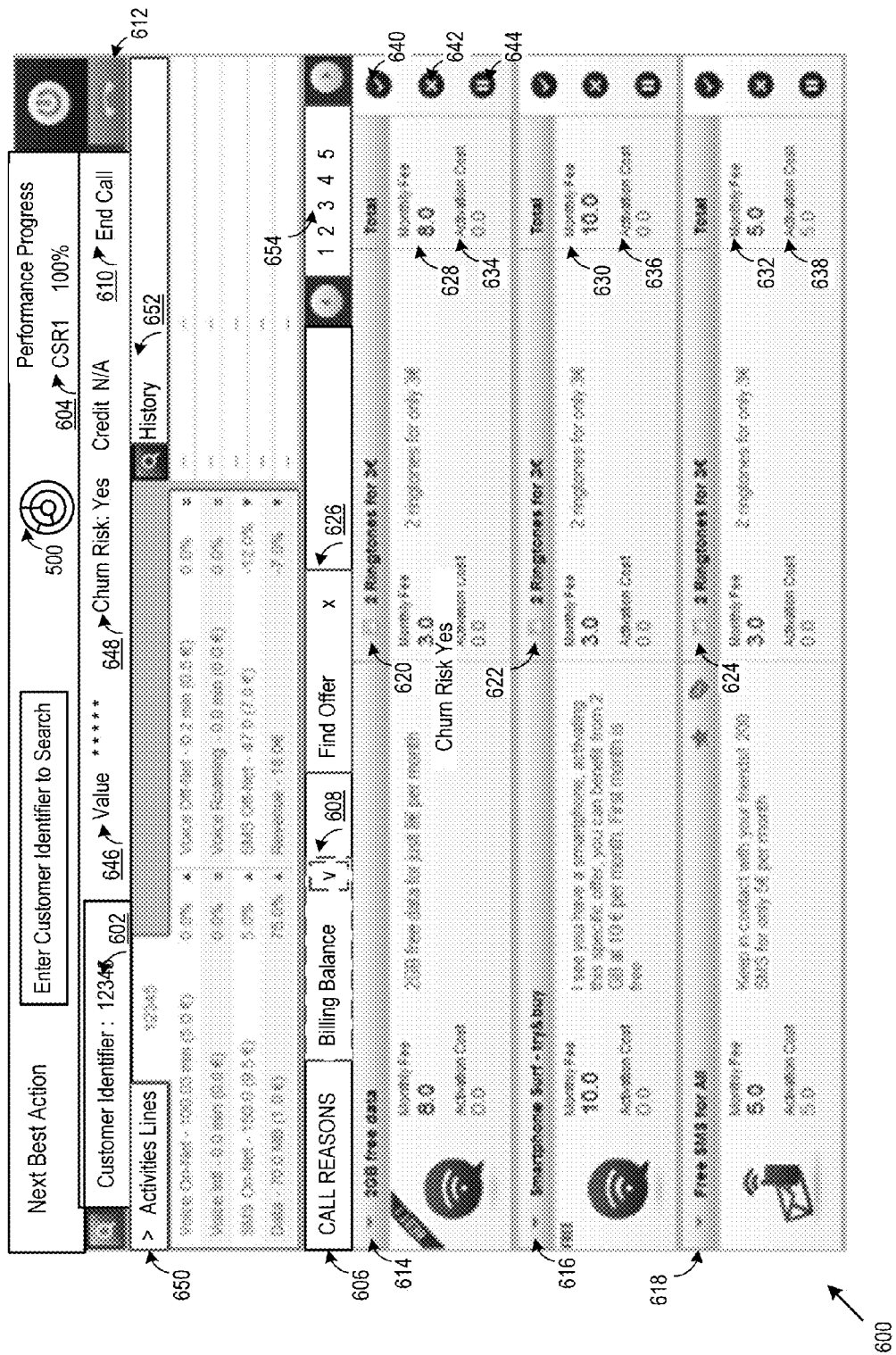
FIG. 6 shows an example graphical user interface the NBA system may present to the call agent.

FIG. 6 shows an example graphical user interface 600 the NBA system may present to the call agent. The NBA system provides multi-channel access (e.g., web, IVR, POS/ATM, Call Center, Shop), customer centric and contextual customer interaction for real time decisioning marketing.

For example, a customer named Adam Smith (e.g., identified by a customer identifier 602), who is a Phone4You customer, may contact a call agent (e.g., identified by the call agent identifier 604 such as CSR1) through one or more of the multiple access channels (e.g., web, IVR, POS/ATM, Call Center, Shop). The service provider may have recently changed the bill structure of the Phone4You, and the customer may not understand the bill structure so the customer calls the call center to receive more information (e.g., call agent selects the call reason 606 to billing balance from a selectable list of call reasons 608). The call center agent may explain to the customer where to find the information the customer is looking for and confirm that the customer is satisfied with the response of the call agent. Before closing the call (610) (e.g., the access channel may be represented by an icon 612 on the user interface), the agent asks the customer if the customer would like to hear about special offers (e.g., 614, 616, 618) that may include next best offers (e.g., 620, 622, 624) tailored for the customer. The customer agrees and the call agent opens the NBA system to locate (e.g., find offer feature 626) the offers of the customer. The NBA system presents the call agent combinations of offers and the fees (628, 630, 632) and costs (634, 636, 638) for the offers. The NBA system provides customer response indicators that indicate the customer's response to an offer (e.g., an accept response 640, a decline response 642, save offer for further consideration response 644). The NBA system may also present customer profile information such as the customer value 646 and the customer churn risk 648, the customer usage metrics 650, and customer contact history 652, and allow the call agent to easily page 654 through eligible offers suitable for the customer.

The call agent may view customer profile information such as the customer value 646 and the customer churn risk 648, the customer usage metrics 650, and customer contact history 652 in a customer profile panel (e.g., may be presented on the upper portion of the user interface). The NBA system assists the agent during the proposal to personalize the conversation. The agent also may enter (e.g., select pull down option) the call reason (606, 608) which acts as real time input for deciding which offer may be the most currently suitable to the customer. The call agent selects the call reason (608) "Billing Balance" and the NBA system calculates a configurable number (e.g., three) top offers (e.g., 614, 616, 618), in line with the customer profile, traffic and selected call reason. The NBA system real-time contextual input combined with business targets and constraints provide the customer with one or more offers and/or communications most relevant to the customer and/or aligned with the company (e.g., service provider) one or more strategies.

For example, on a particular day the customer decision engine may suggest that the 2 GB free data offer (614) as the top offer because the customer data usage has started to increase in last month (650). When the call agent clicks the 2 GB free data offer (614), the NBA system displays details about the 2 GB free data offer (614) and then the agent proposes the 2 GB free data offer (614) to the customer. The customer, however, chooses to decline the offer (e.g., indicated by call agent selecting the decline response 642).

Figure 7:
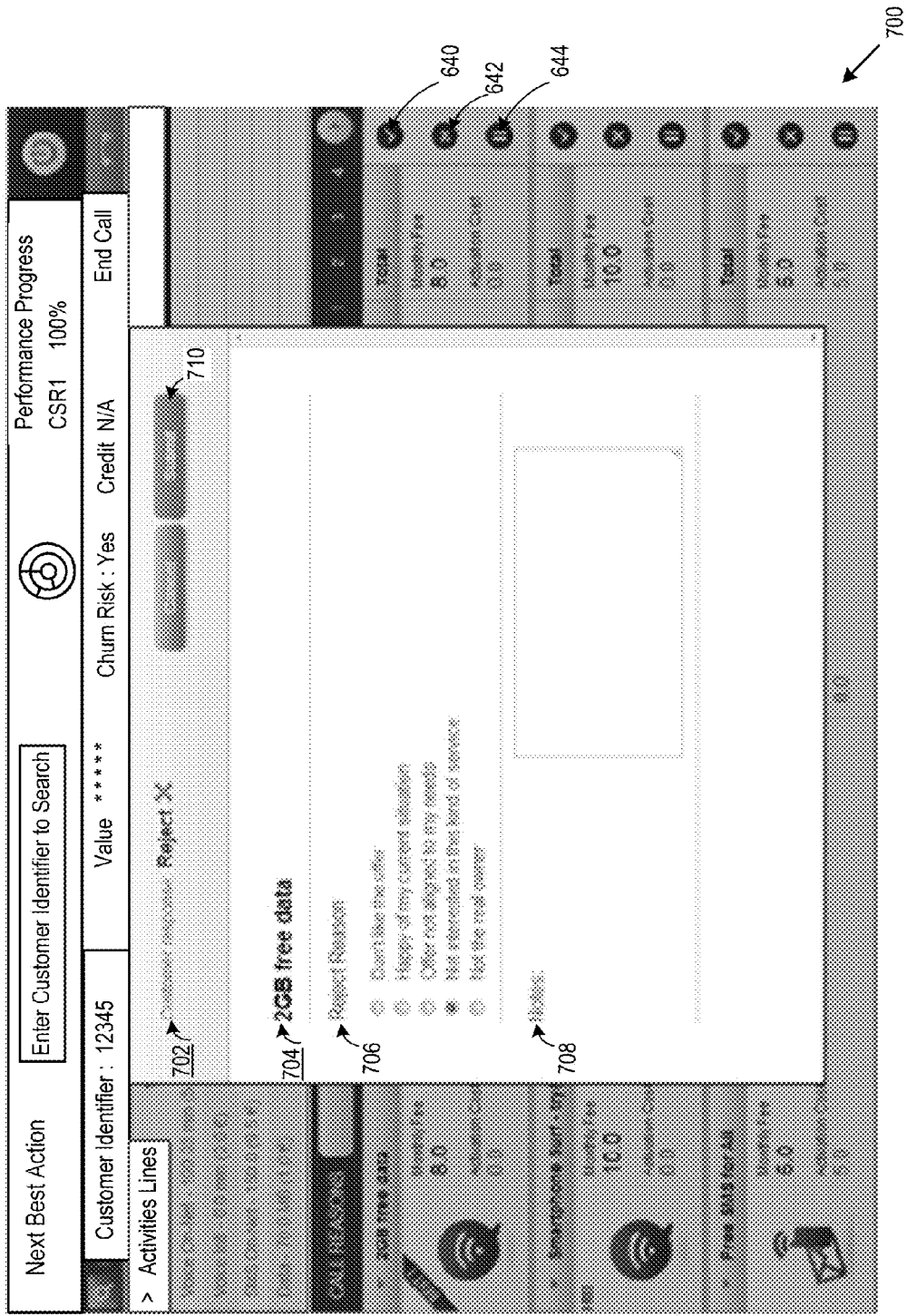
FIG. 7 illustrates an example customer response page the NBA system may present to call agents.

FIG. 7 illustrates an example customer response page 700 the NBA system may present to call agents. The NBA system may present the customer response page 700 to call agents to allow the call agent to capture the response of the customer, by the call agent selecting a customer response indicator (e.g., an accept response 640, a decline response 642, will save offer for further consideration response 644). When the customer chooses to decline an offer the call agent clicks on the decline button 642 and the NBA system may present the customer response page 700. The customer response page 700 presents the customer response 702 (e.g., accept offer, a decline offer, and will consider offer), the title of the offer 704, multiple choice reasons for customer response 706, and notes area 708 the call agent may capture additional information (e.g., further reasons and description of the one or more reasons for the response of the customer) used to assess the customer need and evaluate the NBA system offers determined by one or more adapted models in response to the customer interaction. The call agent captures the response to the offer and reason(s) for the response of the customer, and submits (710) the information to the NBA system for use to evaluate the responsiveness of the offers, determined by the NBA system, to the need of the customer.

Figure 8:
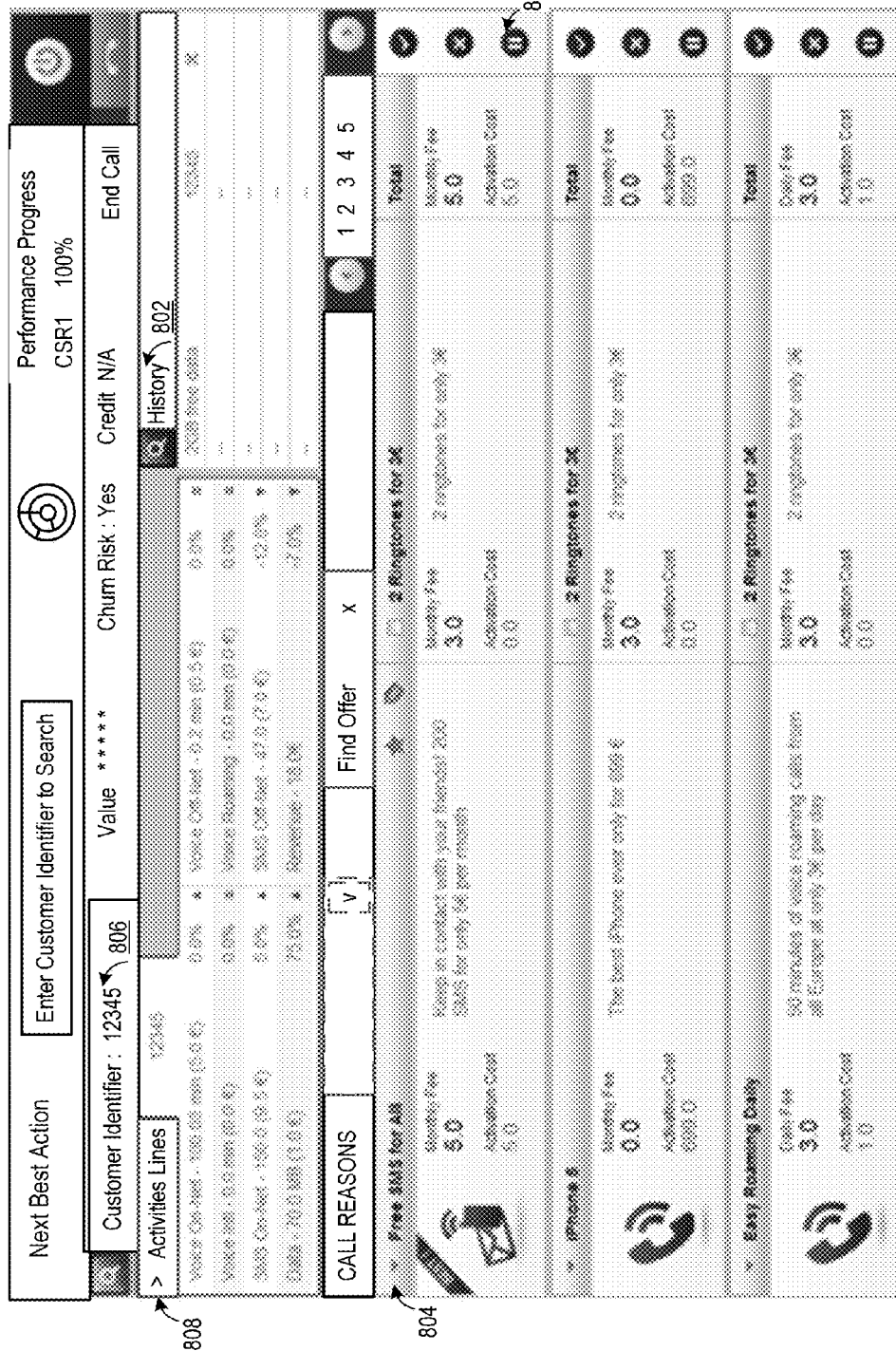
FIG. 8 illustrates another example graphical user interface the NBA system may present to the call agent.

FIG. 8 illustrates another example graphical user interface 800 the NBA system may present to the call agent. After each interaction (e.g., event such as the customer declining an offer decline), the NBA system stores the results of the interaction in one or more memory storage devices and displays the history 802, and re-calculates new offers considering also the previous outcome (e.g., 802). Following a previous interaction, the NBA system determines the next best offer (804) to be the "Free SMS for All" offer, because the customer (806) sends a lot of SMSs (e.g., as shown in the customer usage metrics 808). When a customer indicates a desire to consider an offer (e.g., customer, Adam, expresses a desire to think about the offer) the call agent clicks the save offer button (e.g., save offer for further consideration response 810).

Figure 9:
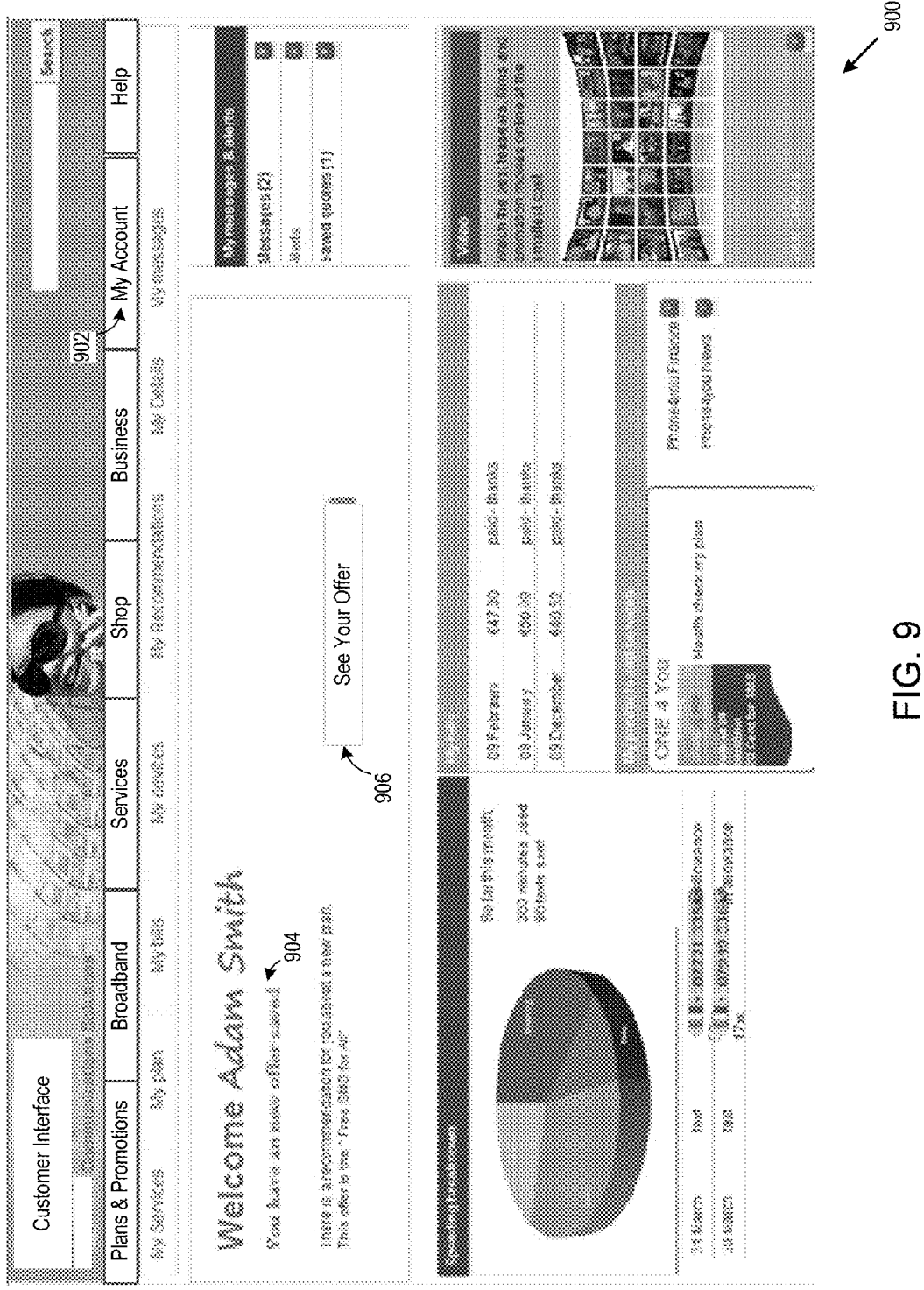
FIG. 9 illustrates an example customer interface for a customer to access one or more accounts of the customer.

FIG. 9 illustrates an example customer interface 900 for a customer to access one or more accounts of the customer. Following the interaction where the customer indicates a desire to consider an offer (e.g., a few days after call agent selects the save offer for further consideration response 810), the customer (e.g., Adam) accesses the personal account 902 of the customer (e.g., using the Phone4You web portal). The customer interface 900 displays the personal page of the customer, including a "You have a new offered saved" 904 hyperlink and/or selectable option, and a "See your offer" 906 hyperlink and/or selectable option to the offer pitched ("Free SMS for All" offer) by the call center agent to the customer during a previous interaction (e.g., him a few days ago). When a customer selects the "You have a new offered saved" 904 hyperlink and/or selectable option or the "See your offer" 906 hyperlink and/or selectable option, the NBA system and/or another system in communication with the customer interface 900 may retrieve the details for the previously pitched offer ("Free SMS for All" offer).

Figure 10:
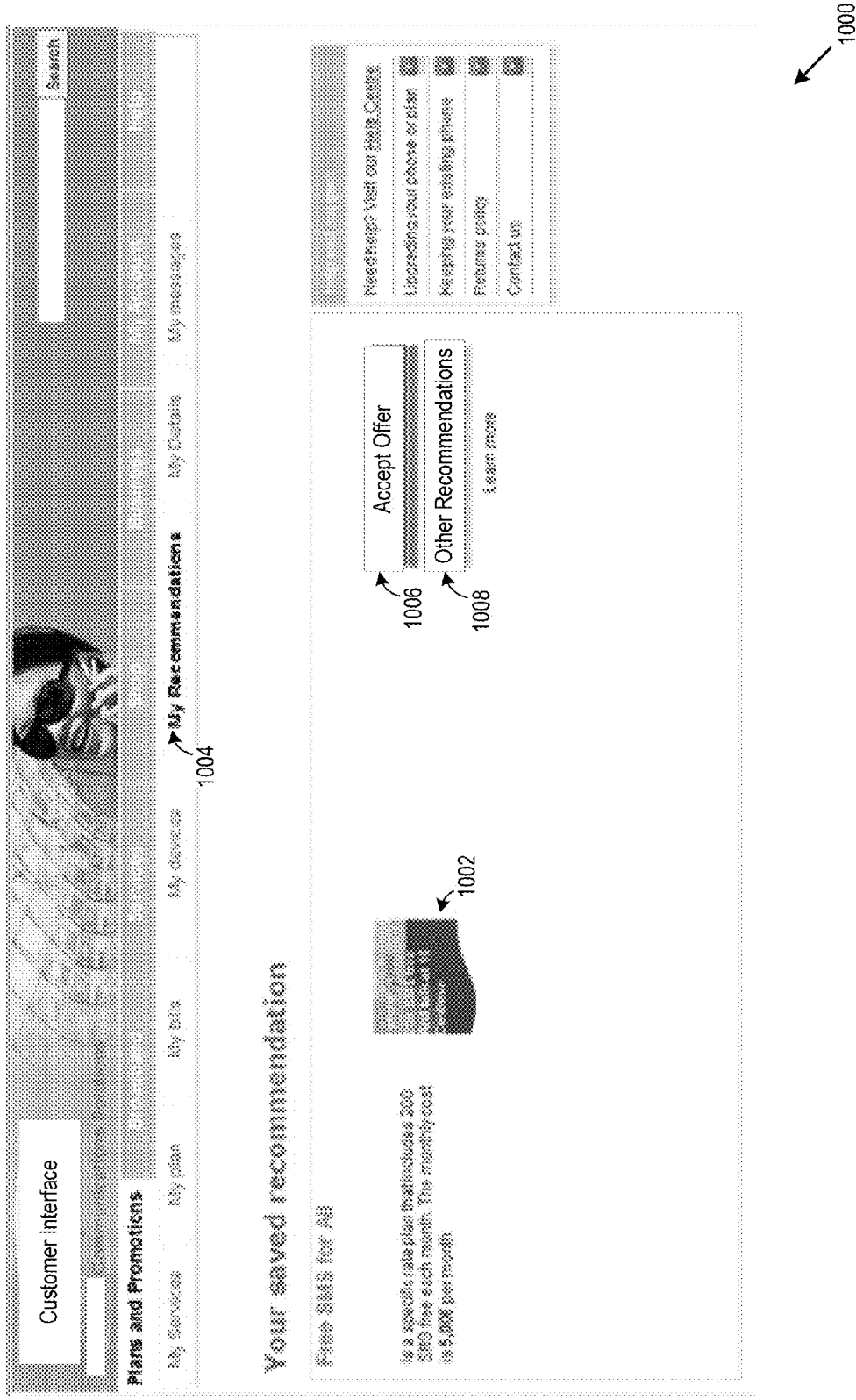
FIG. 10 illustrates an example customer interface for a customer to view a previously pitched offer saved by the NBA system.

FIG. 10 illustrates an example customer interface 1000 for a customer to view a previously pitched offer saved by the NBA system. The customer interface 1000 may present the details for the previously pitched offer 1002 ("Free SMS for All" offer) to the customer (e.g., Adam) as recommendations 1004. The customer may accept the offer (e.g., click on "Accept offer" 1006) hyperlink and/or selectable option, or review other recommendations 1008.

Figure 11:
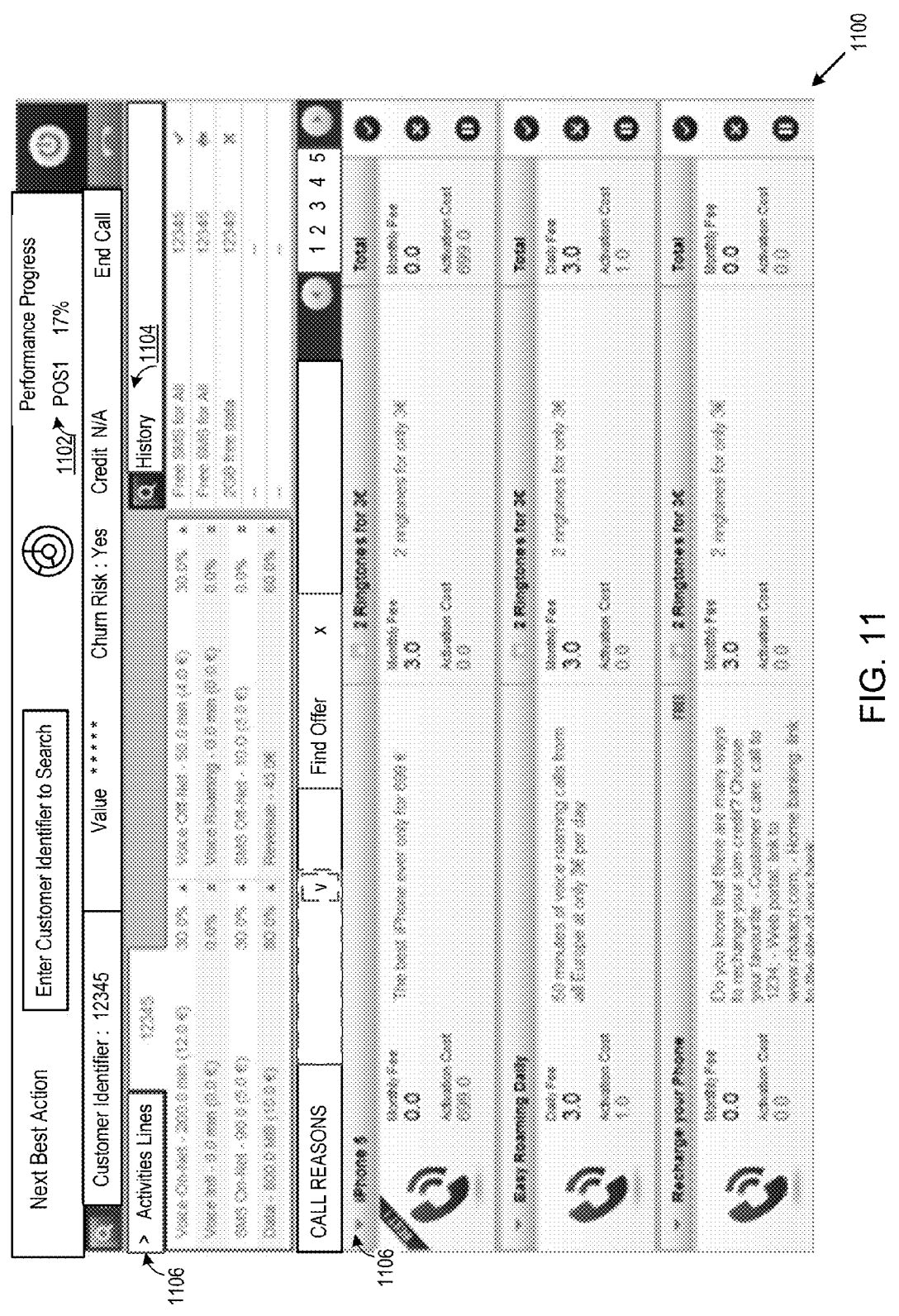

FIG. 11 illustrates another example graphical user interface 1100 the NBA system may present to the call agent. Some elapsed time (e.g., months later) following the previous interaction with the customer, the customer may decide to visit a shop (e.g., store and/or facility of the service provider) because the customer believes the customer is spending too much on one or more active plans in the last few months. The customer explains to the shop agent (e.g., call agent) the reason why the customer is visiting the shop. The shop agent (e.g., call agent) may analyze (e.g., check) usage changes for the customer that have occurred in one or more previous time periods (e.g., the last few months) (e.g., as shown in the customer usage metrics 808) and the history 802 (e.g., contacts and/or interactions) of the customer. The shop agent (e.g., call agent) observes that the data usage for the customer has increased significantly.

Figure 12:
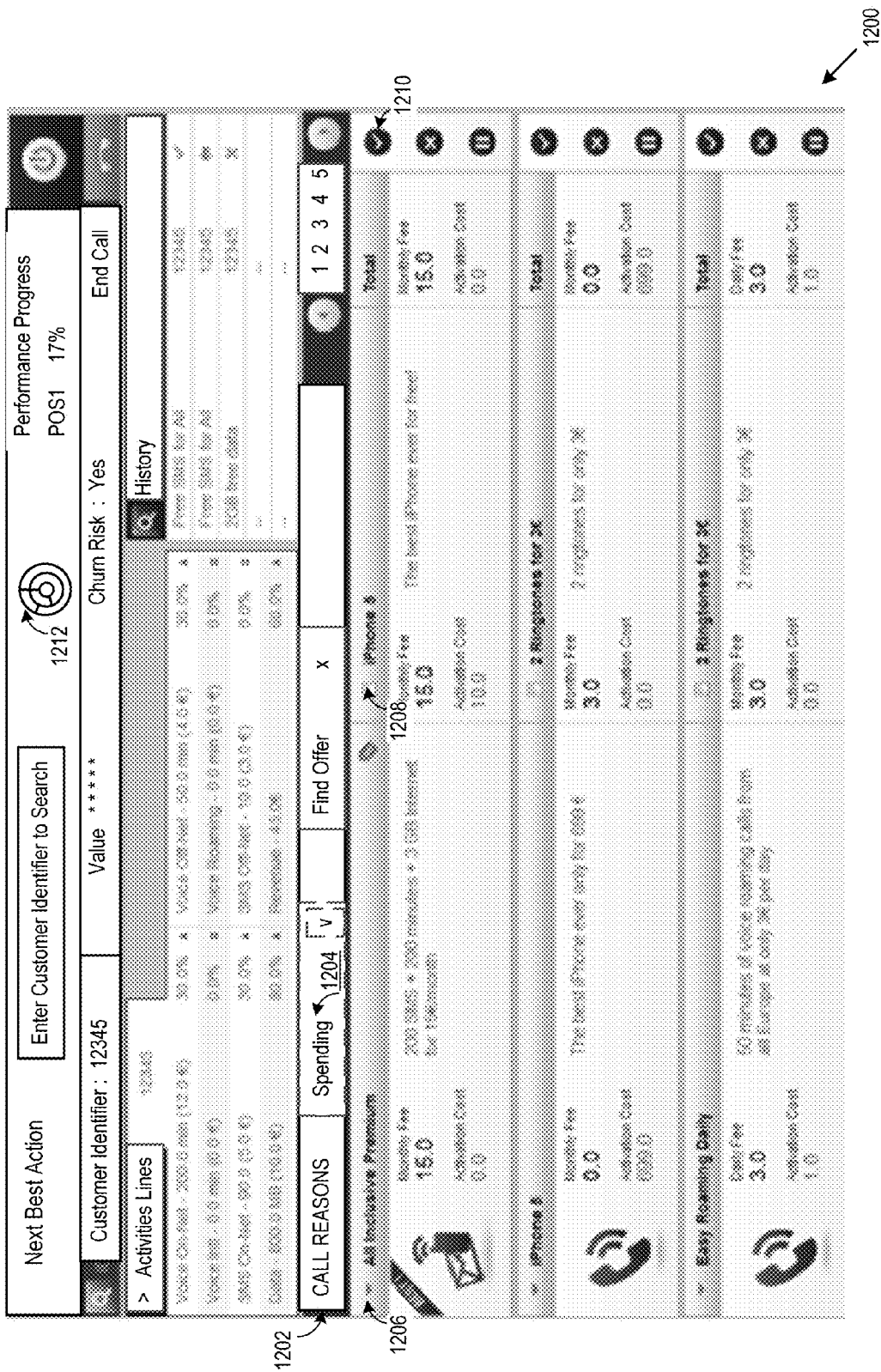
FIG. 12 illustrates another example graphical user interface the NBA system may present to the call agent.

FIG. 12 illustrates another example graphical user interface 1200 the NBA system may present to the call agent. The shop agent (e.g., call agent) may select the 'spending' call reason (1202, 1204). When the shop agent (e.g., call agent) selects the 'spending' call reason (1204) the NBA system executes an offer recalculation. For example, after the NBA system executes an offer recalculation the graphical user interface 1200 presents a new top offer 1206 (e.g., "All inclusive Premium") and associated special offer 1208 (e.g., iPhone5). The shop agent (e.g., call agent) may select the associated special offer 1208 (e.g., iPhone5) and observe that the spending for the associated special offer 1208 is lower than the current spending of the customer. The NBA system provides the agent an opportunity to propose new top offer 1206 (e.g., "All inclusive Premium") and associated special offer 1208 (e.g., iPhone5) to the customer so the customer may realize savings responsive to the needs of the customer. When the customer indicates a desire to accept an offer (e.g., customer, Adam, expresses a desire to accept the 1206, 1208) the call agent clicks the accept offer button (e.g., accept response 1210).

Following a sale, the shop agent (e.g., call agent) may desire to determine how close to meeting the performance targets of the shop agent (e.g., call agent). For example, while waiting for the next customer, the shop agent may view checks the current performance (actual performance for a given period of time) of the shop agent (e.g., call agent), by clicking on the performance progress icon 1212.

Figure 13:
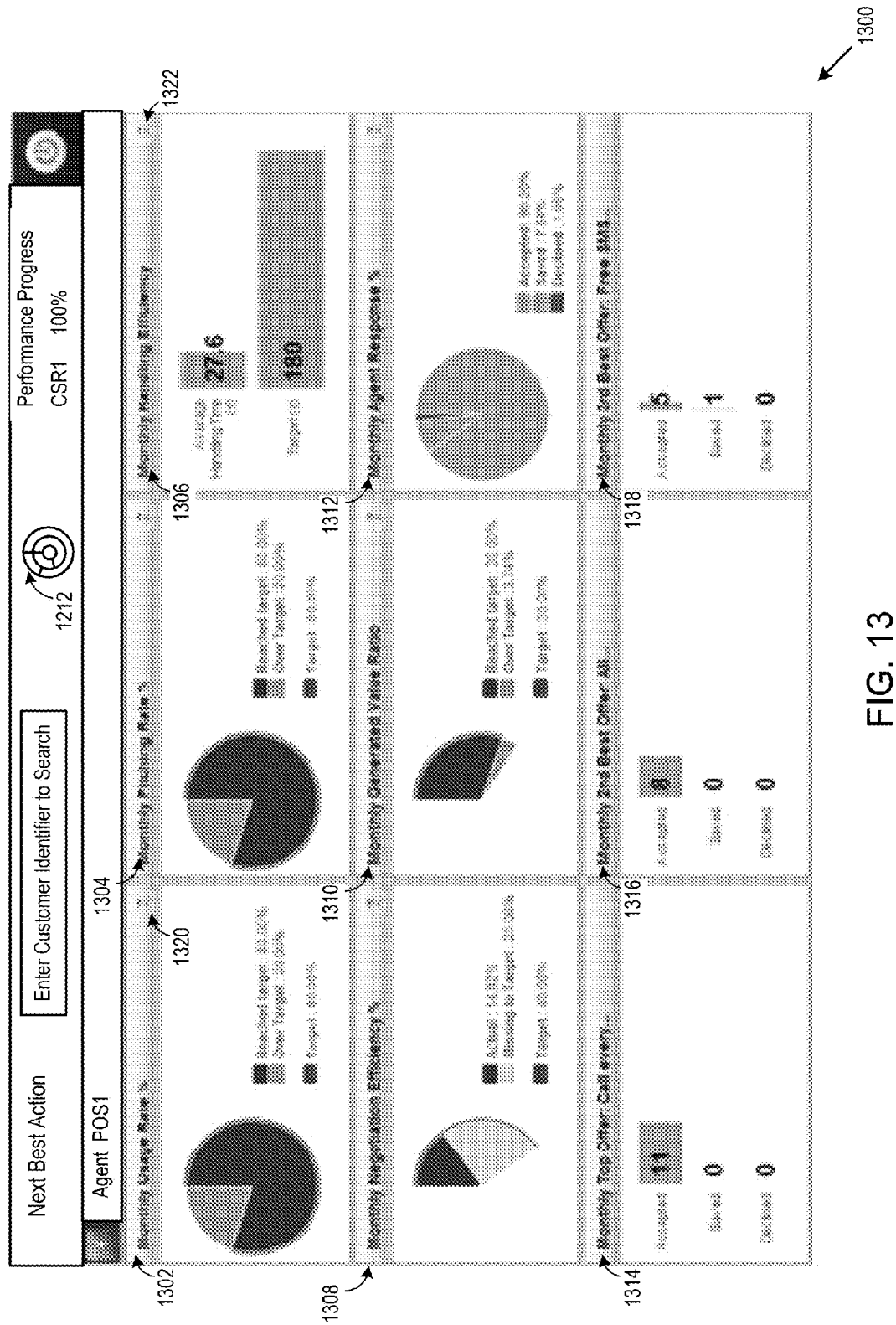
FIG. 13 illustrates an example performance view the NBA system may present to the call agent.

FIG. 13 illustrates an example performance view 1300 the NBA system may present to the call agent. The NBA system may present to the call agent the current performance (actual performance for a given period of time) of the shop agent (e.g., call agent) and target performance metrics, when the shop agent (e.g., call agent) selects the performance progress icon 1212. The NBA system may include in the performance view several KPIs, so the call agent may monitor the KPIs of the call agent in terms of usage 1302, pitching 1304, handling efficiency 1306, negotiations efficiency 1308, generated value 1310, agent responses 1312, top offer 1314, second best offer 1316 and third best office 1318. The question mark button (1320, 1322) presents the call agent with educational material to understand each KPI and how to modify behavior of the call agent to improve the performance of the call agent. The usage 1302 metrics may include one or more usage targets, percentage of usage target reached, and percentage of usage over/under target. The pitching 1304 metrics may include one or more pitching targets, percentage of pitching target reached, and percentage of pitching over/under pitching target. The handling efficiency 1306 metrics may include an average handling time and target handling efficiency measured in units of time (e.g., seconds, minutes, hours and/or days). The negotiations efficiency 1308 metrics may include one or more negotiations efficiency targets, percentage of negotiations efficiency target reached, and percentage of negotiations efficiency over/under negotiations efficiency target. The generated value 1310 metrics may include one or more generated value targets, percentage of generated value target reached, and percentage of generated value over/under generated value target. The agent responses 1312 metrics may include a percentage of accepted, saved and/or declined offers of the offers pitched to the customers by the call agent. The top offer 1314, second best offer 1316 and third best offer 1318 metrics may include a discrete count of accepted, saved and/or declined, top offer 1314, second best offer 1316 and third best offers pitched to customers by the call agent for a given time period.

Figure 14:
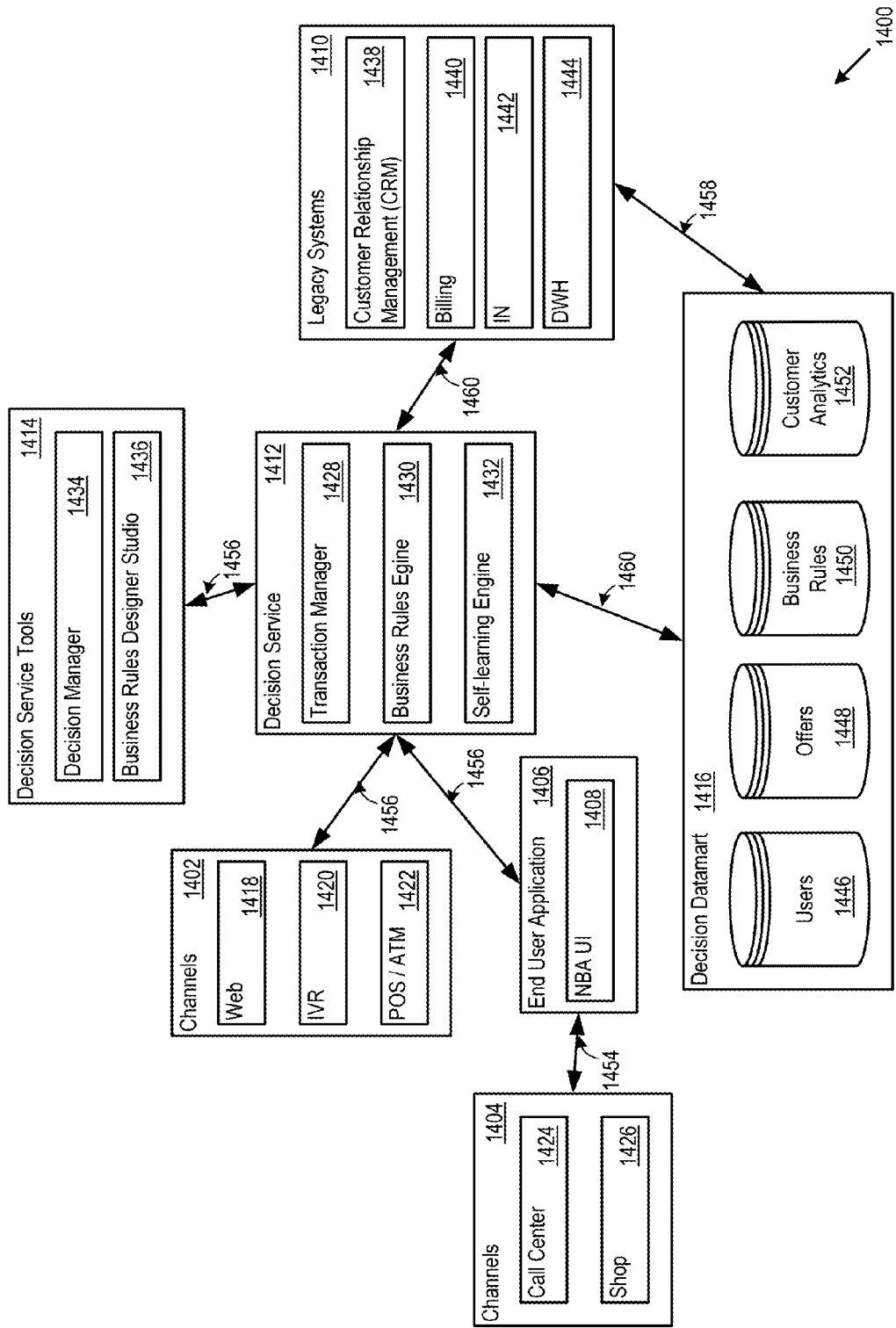
FIG. 14 illustrates an example of a NBA architecture that implements the NBA system.

FIG. 14 illustrates an example of a NBA architecture 1400 that implements the NBA system 102. The NBA system 102 provides a real time decision solution that relies on customer insights, business strategies and context-specific information to determine the most suitable action for a customer. The NBA architecture 1400 may include multiple channels (1402 and 1404), one or more end user applications (1406) (e.g., NBA user interface 1408) and/or legacy systems 1410, decision service 1412, decision service tools 1414 and decision data mart 1416. Users (e.g., customers and call agents, administrators, service providers) use one or more of the multiple channels (1402 and 1404) to access the NBA architecture 1400. The multiple channels (1402 and 1404) may include web browsers 1418, interactive voice response (IVR) technology 1420, point of sale (POS)/automated teller machines (ATM) 1422, one or more call centers 1424 with telephony technology and one or more shops 1426 (e.g., service provide facilities). The decision service 1412 may include a transaction manager 1428, business rules engine 1430 and self-learning engine 1432. The decision service tools 1414 may include a decision manager 1434 and business rules designer studio 1436 to create, edit and delete business rules used by the NBA system. The legacy systems 1410 (e.g., of the service provider and/or third party providers in communications with the service provider) may include one or more customer relationship management (CRM) systems 1438, billing systems 1440, an Intelligent Network (IN) 1442 (e.g., a standard network architecture for fixed and mobile telecom networks, which allows operators to differentiate themselves by providing value-added services in addition to the standard telecom services) and data warehouse systems (DWH) 1444. The decision data mart 1416 may include metadata for and/or about users 1446, offers 1448, business rules 1450 and customer analytics 1452 used by the NBA system to calculate offers responsive to the needs of customers and one or more strategies of the service provider, and performance metrics and call agent interface to monitor and improve the performance metrics of the call agent. The NBA architecture 1400 may employ HTTP 1454, Simple Object Access Protocol (SOAP) 1456 web services, transform and load (ETL) 1458 processes to exchange data between components in the NBA architecture 1400 and one or more data sources 1460 (e.g., one or more databases).

In one implementation, the decision service may be implemented as a set of J2EE components that run in any servlet container, such as Tomcat™, JBoss™ and/or WebLogic™. The rules decision engine (RDE) (e.g., business rules engine) may be based on Drools™ suite, which introduces the business logic integration platform which provides an unified and integrated platform for rules, workflow and event processing. The rules decision engine (RDE) may be implemented as a business rule management system (BRMS) with a forward chaining inference based rules engine, known as a production rule system, using an enhanced implementation of the Rete algorithm. The decision services may also be exposed through a Simple Object Access Protocol (SOAP) web service for easy integration with new and pre-existing architectures.

The NBA Architecture 1400 may employ data connectors that may be java components that retrieve data from external systems (e.g. databases, files, web services). The RDE uses the data as input during business rules executions. The NBA Architecture 1400 may employ one or more transaction services that may be a J2EE service that provides data persistence in the database. The decision services may be exposed by SOAP web service for a smooth integration to new and pre-existing architectures.

Figure 15:
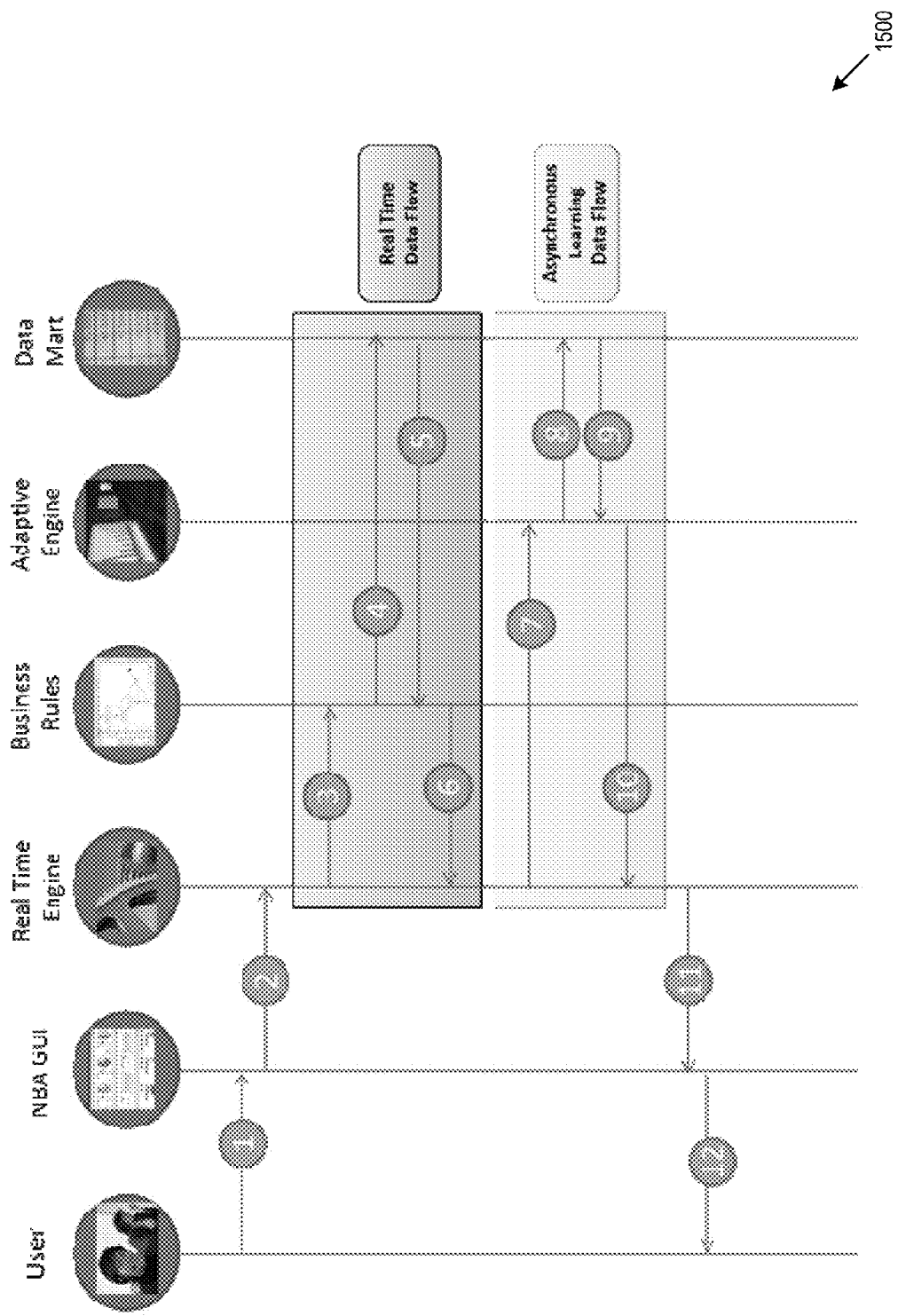
FIG. 15 shows example interactions between the NBA system components used to calculate a best offer for a customer.

FIG. 15 shows example interactions between the NBA system components used to calculate a best offer for a customer. Table 12 shows the description for example NBA system logic flows the processor executable instructions may execute for the NBA components to interact.

TABLE 12

NBA system logic flows

| Flow # | From | To | Description |
|---|---|---|---|
| 1 | User | NBA GUI | User Accesses NBA graphical user interface (GUI) to determine the best Recommendations |
| 2 | NBA GUI | Real Time Engine | NBA GUI relies upon the real time engine to get the best recommendations |
| 3 | Real Time Engine | Business Rules | The Real Time engine performs one or more of the business rules |
| 4 | Business Rules | Data Mart | The business rules query the data mart to get customer information |
| 5 | Data Mart | Business Rules | The Data Mart feeds the business rules engine with customer information |
| 6 | Business Rules | Real Time Engine | The business rules engine feeds the real time engine with computation results |
| 7 | Real Time Engine | Adaptive Engine | The real time engine queries the Adaptive Decisioning Engine |
| 8 | Adaptive Engine | Data Mart | The self-learning engine queries The data Mart to get delta interactions information (the flow is asynchronous) |
| 9 | Data Mart | Adaptive Engine | The data mart feeds the self-learning engine (the flow is asynchronous) |
| 10 | Adaptive Engine | Real Time Engine | The self-learning engine feeds the Real Time Engine |
| 11 | Real Time Engine | NBA GUI | The real time engine provides the best recommendations to the GUI |
| 12 | NBA GUI | User | The user gets the best recommendations from NBA GUI |

Figure 16:
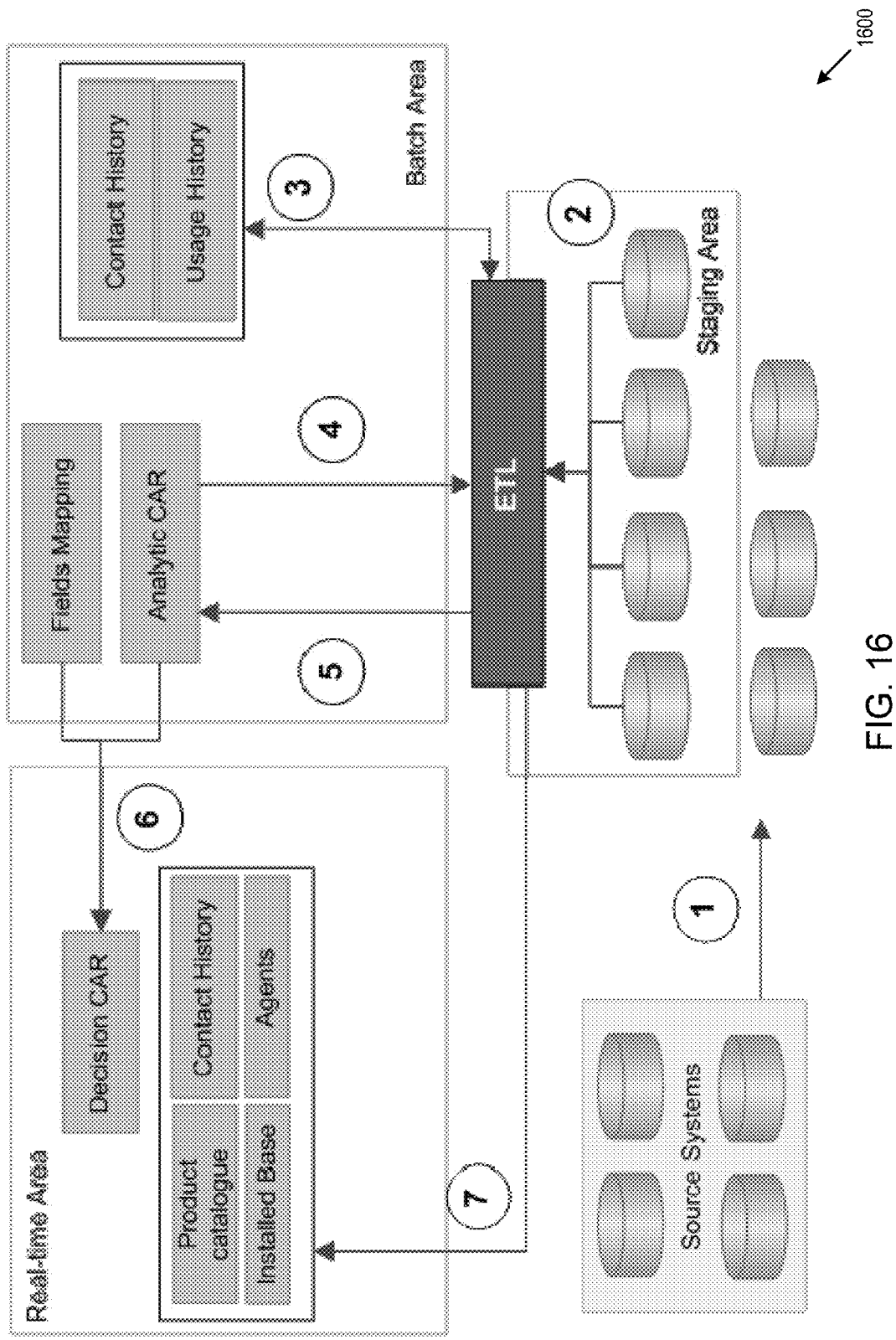
FIG. 16 illustrates an NBA data mart that provides a layer of information the NBA system communicates to the rules decision engine (RDE).

FIG. 16 illustrates an NBA data mart that provides a layer of information the NBA system communicates to the rules decision engine (RDE). The RDE contains data structures that may be used for different purposes such as support the NBA user interface (UI), store transaction information, and provide data to the NBA to execute the NBA rules, in terms of customer attributes, offers, agent information, maintain the catalogue of NBA offers, and configure the solution.

The NBA Architecture 1400 data mart may include different schemas for content and purpose, including: a staging area that collects data from the source systems that feed the NBA data mart; a batch area where the ETL processes of NBA data mart may perform (execute), and where the elaborations and calculations are applied, such as averages, aggregations, de-normalizations and so on; a utility area that may include data structures that support jobs and processes of the ETL; and a real-time area where the final outcome of the ETL processes may perform and where the real time application reads and stores calculated decisions.

The NBA Architecture 1400 may employ multiple data flows, including: 1) source systems may provide (communicate) and/or make available data in the form of interfaces and/or extracts to the NBA system; 2) the NBA system processes data from the staging tables/views using ETL performing the proper calculations and manipulations; 3) the NBA system refreshes the Usage History and Contact History data, and the NBA system includes the Usage History and Contact History data in the build of the Analytic customer analytic records (CAR); 4) the NBA system uses data from the previous build of the Analytic CAR (e.g., 24 hours or the day prior) (e.g., for efficiency); 5) the NBA system provides the refreshed Analytic CAR as output of the ETL process, containing real-time up to date data; 6) the NBA system may use a field mapping configuration tool to manage which attributes are populated or dropped from the decision CAR, which may be a subset of the analytic CAR. When the NBA system completes and verifies the decision CAR, a proper process (e.g., using a synonym at the database level) may handle the logical switch between a previous period (e.g., 24 hours or the day prior) and the current period (e.g., 24 hours or the current day) (new) table, ensuring that the NBA engine points to the appropriate table (e.g., current day) for operations; 7) the reference and support data may be loaded into the real-time area including an installed base (e.g., including product holding, list of active MSISDN services and promotions), contact history (e.g., including inbound and outbound contacts); product catalogue (e.g., including a list of offers-services-products to be included in the deal, considering also compatibility and eligibility between offers-services-products), and agents (e.g., including lookup information on skills and positions of each call agent).

The NBA data model may include different types of schemas and related data structures, including objects related to ETL process and data, including: customer info; agents' info; product catalogue; elaboration and calculation temporary structures; and ETL process support (e.g., logging, scheduling, execution . . . etc.). The different types of schemas and related data structures may include objects related to application functioning, including: transactions information; offers to be proposed; back-end handling (e.g., logic, access to repository . . . etc.).

The NBA system may use the staging area to collect data from the different source systems that feed the NBA data mart. In one implementation, the NBA system may not use the staging area to perform data elaboration and manipulation, except for the application of basic rejection rules regarding the information records that do not match the agreed features of each interface (e.g., file name/table name; data types of fields; and not null fields not populated).

The NBA system may use the batch area to perform the ETL process of the NBA data mart, where the NBA system may apply elaboration and calculations, such as averages, aggregations, de-normalizations and etc. The NBA system may elaborate data structures, including: the Customer Analytic Record (CAR) table (Analytic CAR).

The NBA data mart may use the Customer Analytic Record (CAR) table data source for NBA logic. The CAR table may contain customer information (e.g., usage, demographic, billing, etc.), which the NBA data mart may store as one single record per customer). The NBA data mart stores usage history of a configurable period of time (e.g., a historical depth of twelve months in order to consider behaviors and trends for the past twelve months). The NBA data mart stores contact history data about outbound campaigns of a configurable period of time (e.g., a historical depth of six months in order to consider past responses and apply related business rules). The NBA system may use one or more adaptive models to determine the configurable period of time of data to use.

The NBA data mart may use the real-time area to provide a data structure to the NBA logic engine (e.g., real-time with adequate performance). The NBA system may create a subset of the analytic CAR on a configurable frequency (e.g., every day or 24 hours) (as final result of ETL process). The decision CAR table contains the cardinality of analytic CAR (e.g., so then the NBA customer base) and one or more of the columns (KPIs) that the NBA logic may use to determine the best offer for the customer. Also, other data structures may be referenced by the NBA processor executable instructions, including: product catalogue, installed base and information for each agent: the information may not require data manipulation but may be imported directly from the staging area; and internal data structures: used directly by the NBA system to record transaction details and handle GUI and other attributes.

Figure 17:
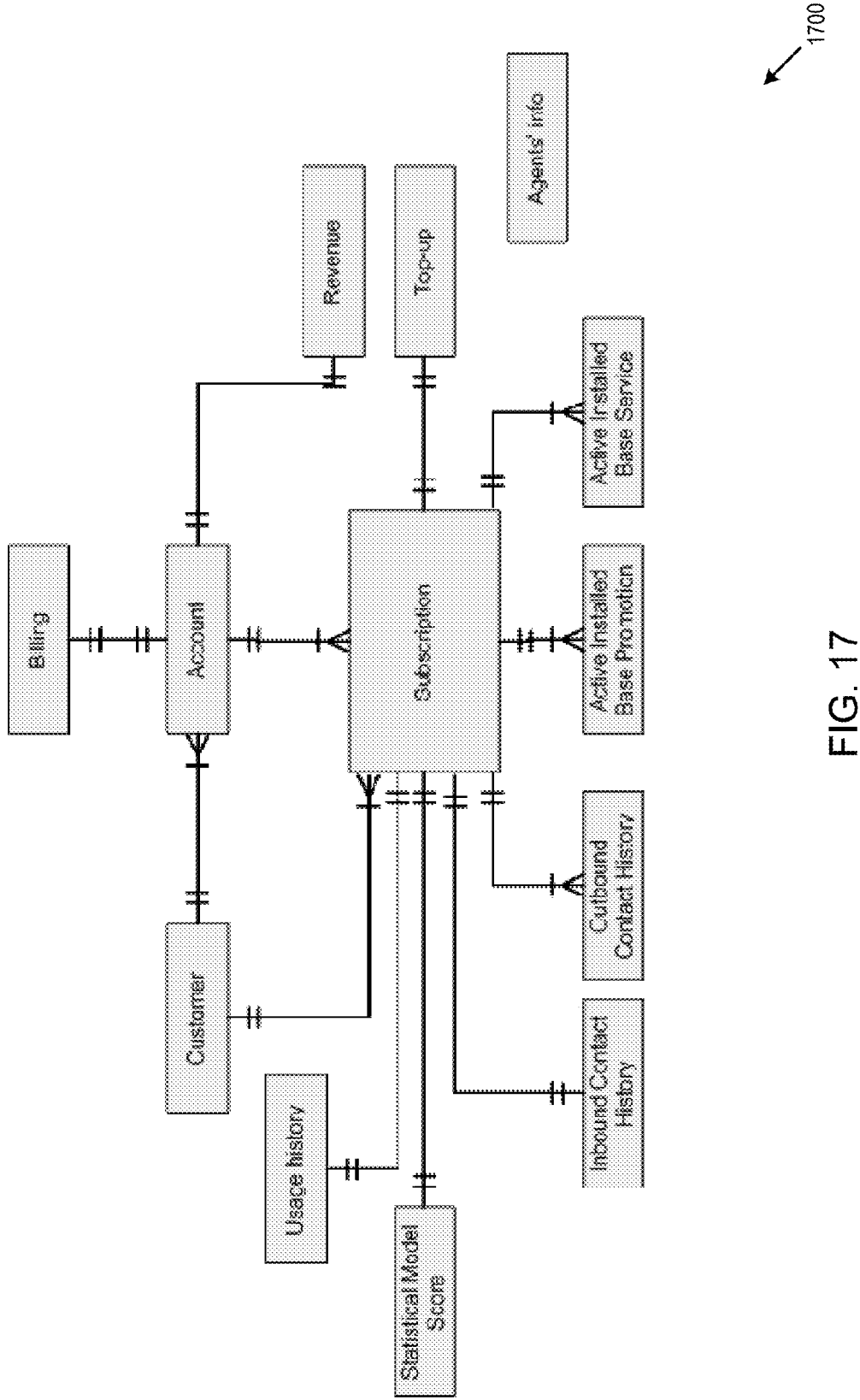
FIG. 17 illustrates an example Entity-Relationship diagram that the NBA system may use to define the NBA system database schema.

FIG. 17 illustrates an example Entity-Relationship diagram 1800 that the NBA system may use to define the NBA system database schema. The subscription entity contains subscription identifier (e.g., Mobile Subscriber Integrated Services Digital Network-Number (MSISDN)), Account codes and Customer codes. The NBA system may consolidate the information at the customer level (e.g., unique view of customer metadata).

Relationships identified by the Entity-Relationship diagram 1800 may include: Subscription—Account: many-to-one based on Account code (an Account may have more than one MSISDN); Account—Customer: many-to-one based on Customer code (a Customer may have more than one Account); Customer—Subscription: one-to-many based on Customer code (a Customer may have more than one MSISDN); Account—Revenue: one-to-one based on Account code; Account—Billing: one-to-one based on Account code; Subscription—Usage History: one-to-one based on MSISDN; Subscription—Statistical Model Scores: one-to-one based on MSISDN; Subscription—Inbound Contact History: one-to-one based on MSISDN (info will be grouped by NBA call reasons and provided at one row per MSISDN); Subscription—Outbound Contact History: one-to-many based on MSISDN (a MSISDN can be included in more than one campaign produced for outbound); Subscription—Active Installed Base Promotion: one-to-many based on MSISDN (a MSISDN may have more than one promotion); Subscription—Active Installed Base Service: one-to-many based on MSISDN (a MSISDN may have more than one service); Subscription—Top-up: one-to-one based on MSISDN; and Agents' info is not related with other categories.

Figure 18:
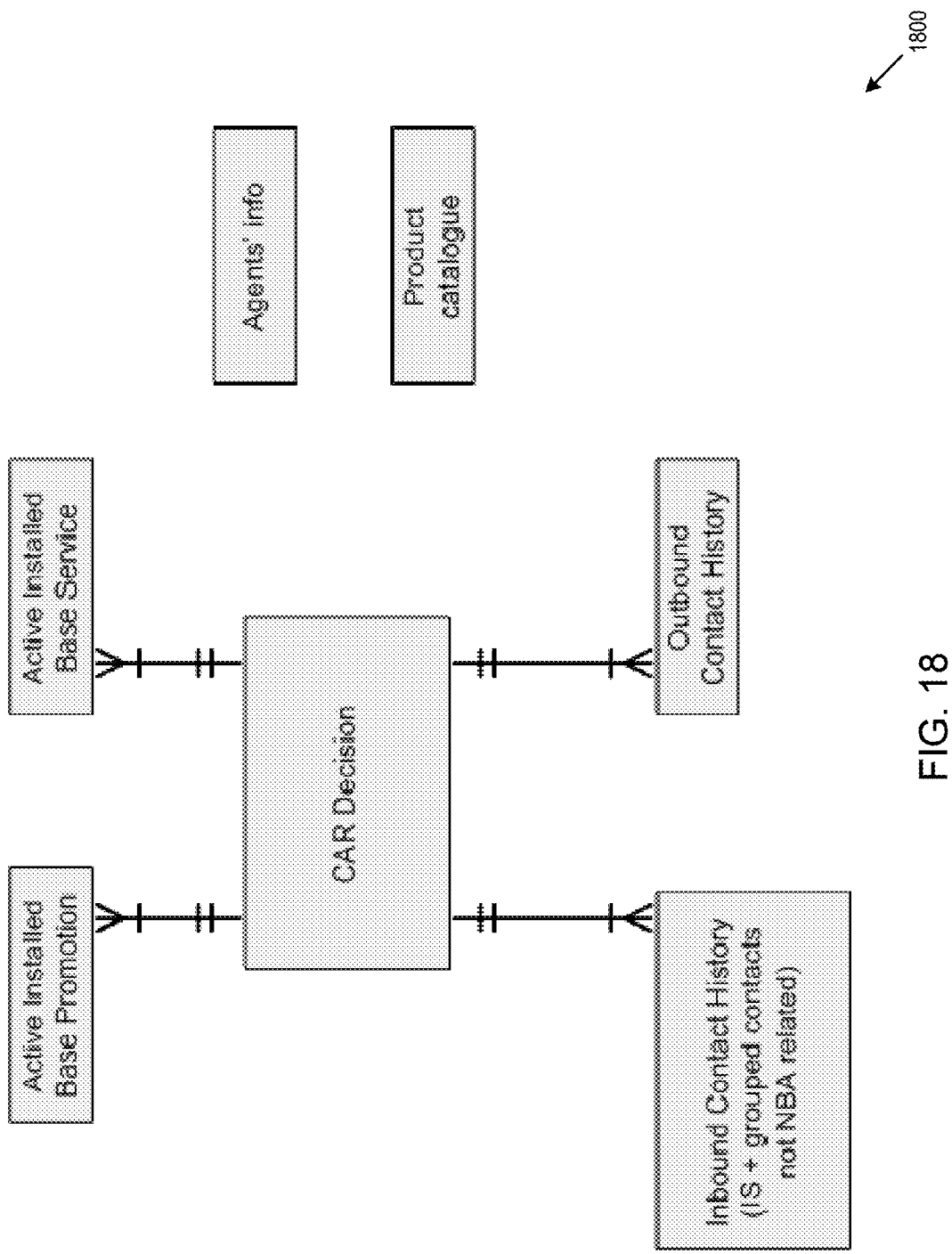
FIG. 18 illustrates an example Entity-Relationship diagram real-time area.

FIG. 18 illustrates an example Entity-Relationship diagram real-time area. The CAR decision contains the MSISDN as primary key. Relations identified: CAR decision—Active Installed Base Promotion: one-to-many based on MSISDN (a MSISDN may have more than one promotion); CAR decision—Active Installed Base Service: one-to-many based on MSISDN (a MSISDN may have more than one service); CAR decision—Inbound Contact History: one-to-many based on MSISDN (a MSISDN may have been contacted more than once with NBA in the past); CAR decision—Outbound Contact History: one-to-many based on MSISDN (a MSISDN can be included in more than one campaign produced for outbound); and information for agents may not be related with other categories and may be referenced directly as needed (e.g., by the logic engine).

Figure 19:
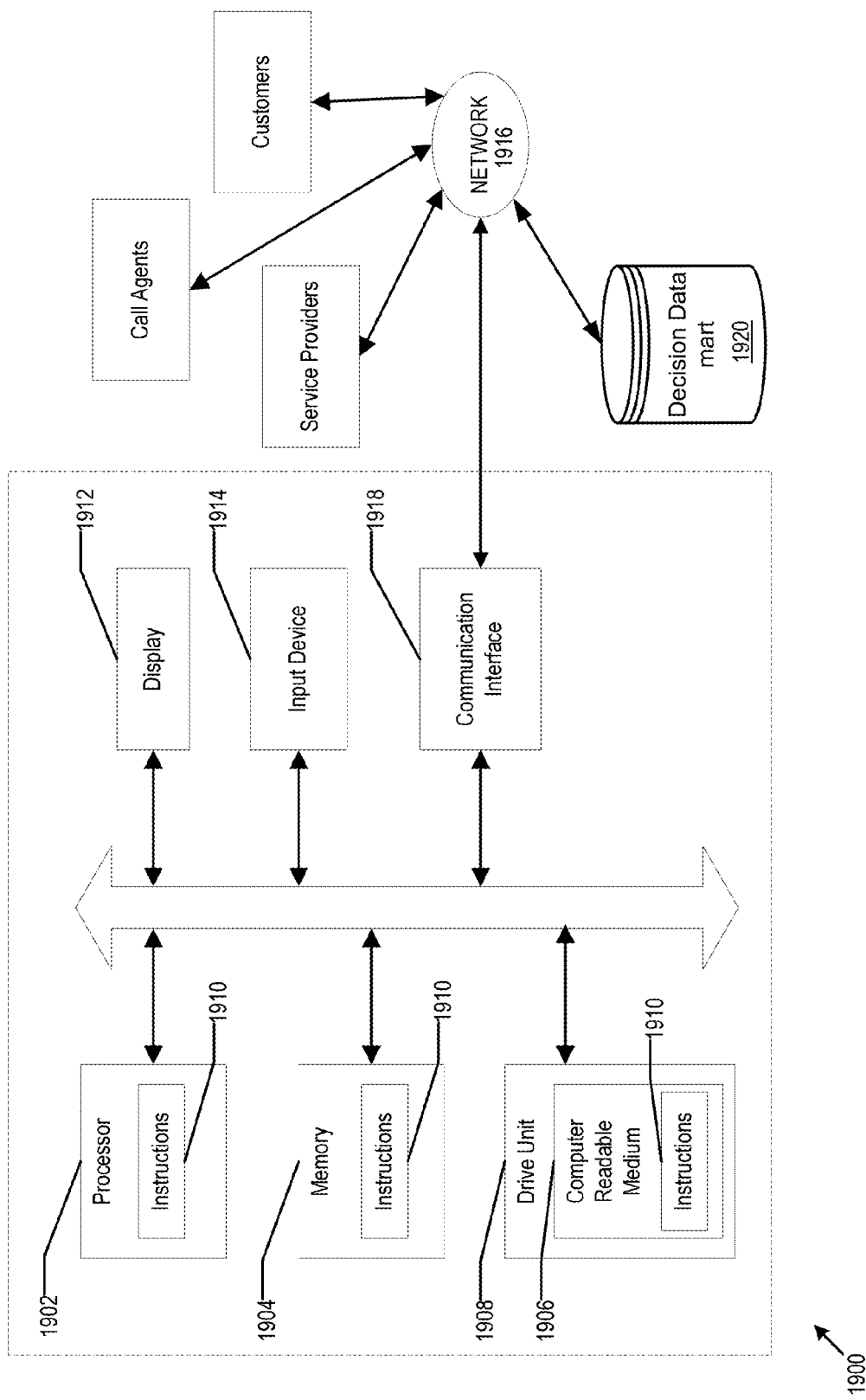
FIG. 19 illustrates a general computer system which may represent the NBA system.

FIG. 19 illustrates a general computer system 1900 which may represent the NBA system, one or more service provider servers, or any of the other computing devices referenced herein. The computer system may include a set of instructions that may be executed to cause the computer system to perform any one or more of the methods or computer based functions disclosed herein. The computer system may operate as a standalone device or may be connected (e.g., using a network) to other computer systems or peripheral devices.

In a networked deployment, the computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

As illustrated in FIG. 19, the computer system may include a processor, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processor may implement a software program, such as code generated manually (i.e., programmed).

The computer system may include a memory that can communicate via a bus. The memory may be a main memory, a static memory, or a dynamic memory. The memory may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the system memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

Additionally, the computer system may include an input device configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit may include a computer-readable medium in which one or more sets of instructions, e.g. software, can be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal; so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system 2400, or combinations thereof. The connection with the network may be a physical connection, such as a wired Ethernet connection or may be established wirelessly as discussed below. Likewise, the additional connections with other components of the system may be physical connections or may be established wirelessly. In the case of a service provider server, the service provider server may communicate with users 120A-N through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A Next Best Action (NBA) management system comprising:
   a channel to couple a call agent to the NBA management system; and
   a memory coupled to a processor, the memory comprising:
      a NBA data mart that stores data about users, offers, business rules and customer analytics that are used by the NBA management system to calculate offers, wherein the data is extracted from external sources and transformed into flattened data structures in the data mart including tables used to read information when making an offer decision, the data mart further comprising:
         a staging area that collects the data from source systems;
         a batch area to perform extract, transform and load (ETL) processes on the data and to elaborate data structures within the batch area including an analytic Customer Analytic Record (CAR) table that comprises one single record per customer; and
         a real-time area where applications read and store calculated decisions, the real-time area comprising a plurality of data structures including a decision CAR table that comprises one or more columns of key performance indicators (KPIs) including Usage oriented KPIs and Sales oriented KPIs, wherein data within the decision CAR table comprises field data mapped from the analytic CAR table of the batch area;
      a treatment eligibility component executable by the processor to:
         determine based on the Usage oriented KPIs, the Sales oriented KPIs or both, a customer treatment including development treatment, retention treatment, education treatment, next best offer, or some combination thereof, and communicate the customer treatment to a call agent via the channel and an end user application, the end user application comprising a user interface, during a customer call with the call agent;
      an offer prioritization component executable by the processor to:
         identify a priority score for an offer by multiplying a probability of a positive response to the offer by one or more values, wherein the processor calculates the probability of a positive response using adaptive models to calculate a propensity for each offer for each customer and the one or more values multiplied by the probability includes one or more of:
            a value based on a projected financial value of an acceptance of the offer by the customer;
            a customer strategy weight based on a selected strategy for the customer;
            an offer weight used to up-weight or down-weight individual offers based on relevance of an offer to the customer, and
            a context weight used to up-weight the offer based on information obtained during the customer call; and
         communicate the priority score for the offer to the call agent via the channel and the end user application;
      an agent Performance component executable by the processor to:
         receive, into the memory, performance results for the call agent used to calculate the Usage oriented KPIs and the Sales oriented KPIs; and
         calculate an Inbound Campaign Agent Performance Index (ICAPI) for each call agent using the Usage oriented KPIs and the Sales oriented KPIs by adding a weighted portion of the Usage oriented KPIs and the Sales oriented KPIs;
      the end user application comprising the user interface executable by the processor to:
         display for each call agent the ICAPI as a progression bar on the user interface; and
         display to the call agent during the customer call, a customer response selection indicator where a selectable customer preference for an offer includes choices of accept, decline, and the hold the offer for the customer's consideration, wherein the customer response selection indicator is selectable by clicking on the user interface presented to the call agent.

2. The system of claim 1, wherein the usage oriented KPIs include: usage rate percentage equal to a number of NBA interactions divided by a total call center customer calls; Pitching Rate percentage equal to a number of NBA recorded interactions divided by a number of NBA eligible calls; and Handling Efficiency percentage equal to a number of NBA optimal handling time interactions divided by number of NBA total handling time.

3. The system of claim 2, wherein the NBA recorded interactions include the number of NBA calls eligible with at least one customer response; wherein the Sales oriented KPIs include: Negotiation Efficiency percentage equal to the number of NBA recorded interactions divided into a number of accepted offers added to a number of saved offers multiplied by a saved offers coefficient; and Generated Value percentage equal to number of optimal projected sales value target divided by a number of projected sales value.

4. The system of claim 1, wherein the next best offer includes education treatment, Churn Prevention treatment and cross sell offers.

5. The system of claim 1, wherein the probability of a positive response to the offer is modified by a Value versus Volume "n" lever that determines whether to place emphasis on Likelihood of acceptance (volume) or financial benefit (value).

6. The system of claim 5, wherein the processor uses an adaptive model per each offer, wherein the strategy weight determines the customer treatment based on tenure of the customer, and spending of the customer.

7. The system of claim 6, wherein the projected financial value for the customer accepting the offer is equal to [(Future annual revenue per user (ARPU)−Current ARPU)+Monthly Fee]*Estimated Offer Life Time+Activation Cost where Future ARPU=Sum of {[(Last Month Usage−Offer Bundle)*cost out of bundle]} for traffic types impacted by the offer, and Current ARPU=Sum of {Last month Revenue} for traffic types impacted by the offer.

8. The method of claim 1, wherein the probability of a positive response to the offer is modified by a Value versus Volume "n" lever that determines whether to place emphasis on Likelihood of acceptance (volume) or financial benefit (value).

9. The method of claim 8, wherein the processor uses an adaptive model per each offer, wherein the strategy weight determines the customer treatment based on tenure of the customer, and spending of the customer.

10. The method of claim 9, wherein the projected financial value for the customer accepting the offer is equal to [(Future annual revenue per user (ARPU)−Current ARPU)+Monthly Fee]*Estimated Offer Life Time+Activation Cost where Future ARPU=Sum of {[(Last Month Usage−Offer Bundle) *cost out of bundle]} for traffic types impacted by the offer, and Current ARPU=Sum of {Last month Revenue} for traffic types impacted by the offer.

11. A Next Best Action (NBA) management method comprising:
  storing data in a NBA data mart coupled to a processor and a channel, the data including information about users, offers, business rules and customer analytics that are used by the NBA management system to calculate offers, wherein the data is extracted from external sources and transformed into flattened data structures in the data mart including tables used to read information when making an offer decision, and wherein:
    a staging area of the data mart collects the data from source systems;
    a batch area in the data mart performs extract, transform and load (ETL) processes on the data and elaborates data structures within the batch area including an analytic Customer Analytic Record (CAR) table that comprises one single record per customer; and
    applications read and store calculated decisions in a real-time area of the data mart, the real-time area comprising a plurality of data structures including a decision CAR table that comprises one or more columns of key performance indicators (KPIs) including Usage oriented KPIs and Sales oriented KPIs, wherein data within the decision CAR table comprises field data mapped from the analytic CAR table of the batch area;
  determining by the processor executing a treatment eligibility component, based on the usage oriented KPIs, the sales oriented KPIs or both, a customer treatment including development treatment, retention treatment, education treatment, next best offer, or some combination thereof, and communicating the customer treatment to a call agent via the channel and an end user application, the end user application comprising a user interface executable on the processor, during a customer call;
  identifying by the processor executing an offer prioritization component, a priority score for an offer by multiplying a probability of a positive response to the offer by one or more values, wherein the processor calculates the probability of a positive response using adaptive models to calculate a propensity for each offer for each customer and the one or more values multiplied by the probability includes one or more of:
    a value based on a projected financial value of an acceptance of the offer by the customer;
    a customer strategy weight based on a selected strategy for the customer;
    an offer weight used to up-weight or down-weight individual offers based on relevance of an offer to a customer; and
    a context weight used to up-weight the offer based on information obtained during a customer call;
  communicating the priority score for the offer to the call agent via the channel and the end user application;
  receiving, into the memory, by the processor executing an agent performance component, performance results for the call agent used to calculate the Usage oriented KPIs and the Sales oriented KPIs;
  calculating an Inbound Campaign Agent Performance Index (ICAPI) for each call agent using the Usage oriented KPIs and the Sales oriented KPIs by adding a weighted portion of the Usage oriented KPIs and the Sales oriented KPIs;
  displaying, using the user interface, for each call agent the ICAPI as a progression bar on the user interface, the ICAPI communicated to the call agent via the channel; and
  displaying to the call agent during the customer call, a customer response selection indicator where a selectable customer preference for an offer includes choices of accept, decline, and the hold the offer for the customer's consideration, wherein the customer response selection indicator is selectable by clicking on the user interface presented to the call agent.

12. The method of claim 11, wherein the usage oriented KPIs include: usage rate percentage equal to a number of NBA interactions divided by a total call center customer calls; pitching Rate percentage equal to a number of NBA recorded interactions divided by a number of NBA eligible calls; and Handling Efficiency percentage equal to a number of NBA optimal handling time interactions divided by number of NBA total handling time.

13. The method of claim 12, wherein the NBA recorded interactions include the number of NBA calls eligible with at least one customer response; wherein the Sales oriented KPIs include: Negotiation Efficiency percentage equal to the number of NBA recorded interactions divided into a number of accepted offers added to a number of saved offers multiplied by a saved offers coefficient; and Generated Value percentage equal to number of optimal projected sales value target divided by a number of projected sales value.

14. The method of claim 11, wherein the next best offer includes education treatment, Churn Prevention treatment and cross sell offers.

15. A Next Best Action (NBA) management product comprising:
  a non-transitory computer readable medium with processor executable instructions stored thereon, wherein the instructions when executed by a processor cause the processor to:
    store data in a NBA data mart coupled to a processor and a channel, the data including information about users, offers, business rules and customer analytics that are used by the NBA management system to calculate offers, wherein the data is extracted from external sources and transformed into flattened data structures in the data mart including tables used to read information when making an offer decision, and wherein:
      a staging area of the data mart collects the data from source systems;
      a batch area in the data mart performs extract, transform and load (ETL) processes on the data and elaborates data structures within the batch area including an analytic Customer Analytic Record (CAR) table that comprises one single record per customer; and
      applications read and store calculated decisions in a real-time area of the data mart, the real-time area comprising a plurality of data structures including a decision CAR table that comprises one or more columns of key performance indicators (KPIs) including Usage oriented KPIs and Sales oriented KPIs, wherein data within the decision CAR table comprises field data mapped from the analytic CAR table of the batch area;
    determine, based on the Usage oriented KPIs, the Sales oriented KPIs or both, a customer treatment including development treatment, retention treatment, education treatment, next best offer, or some combination thereof, and communicate the customer treatment to a call agent via the channel and an end user application, the end user application comprising a user interface executable on the processor, during a customer call;

identify a priority score for an offer by multiplying a probability of a positive response to the offer by one or more values, wherein the processor calculates the probability of a positive response using adaptive models to calculate a propensity for each offer for each customer and the one or more values multiplied by the probability includes one or more of:
- a value based on a projected financial value of an acceptance of the offer by the customer;
- a customer strategy weight based on a selected strategy for the customer;
- an offer weight used to up-weight or down-weight individual offers based on relevance of an offer to a customer; and
- a context weight used to up-weight the offer based on information obtained during a customer call;

communicate the priority score for the offer to the call agent via the channel and the end user application;

receive, into the memory, performance results for the call agent used to calculate the Usage oriented KPIs and the Sales oriented KPIs;

calculate an Inbound Campaign Agent Performance Index (ICAPI) for each call agent using the Usage oriented KPIs and the Sales oriented KPIs by adding a weighted portion of the Usage oriented KPIs and the Sales oriented KPIs;

display, using the user interface, for each call agent the ICAPI as a progression bar on the user interface, the ICAPI communicated to the call agent via the channel; and display to the call agent during a customer call a customer response selection indicator where a selectable customer preference for an offer includes choices of accept, decline, and the hold the offer for a customer's consideration, wherein the customer response selection indicator is selectable by clicking on the user interface presented to the call agent.

16. The product of claim 15, wherein the usage oriented KPIs include: usage rate percentage equal to a number of NBA interactions divided by a total call center customer calls; Pitching Rate percentage equal to a number of NBA recorded interactions divided by a number of NBA eligible calls; and Handling Efficiency percentage equal to a number of NBA optimal handling time interactions divided by number of NBA total handling time.

17. The product of claim 16, wherein the NBA recorded interactions include the number of NBA calls eligible with at least one customer response; wherein the Sales oriented KPIs include: Negotiation Efficiency percentage equal to the number of NBA recorded interactions divided into a number of accepted offers added to a number of saved offers multiplied by a saved offers coefficient; and Generated Value percentage equal to number of optimal projected sales value target divided by a number of projected sales value.

18. The product of claim 15, wherein the next best offer includes education treatment, Churn Prevention treatment and cross sell offers.

19. The product of claim 15, wherein the probability of a positive response to the offer is modified by a Value versus Volume "n" lever that determines whether to place emphasis on Likelihood of acceptance (volume) or financial benefit (value).

20. The product of claim 19, wherein the processor uses an adaptive model per each offer, wherein the strategy weight determines the customer treatment based on tenure of the customer, and spending of the customer.

21. The product of claim 20, wherein the projected financial value for the customer accepting the offer is equal to [(Future annual revenue per user (ARPU)−Current ARPU)+Monthly Fee]*Estimated Offer Life Time+Activation Cost where Future ARPU=Sum of {[(Last Month Usage−Offer Bundle)*cost out of bundle]} for traffic types impacted by the offer, and Current ARPU=Sum of {Last month Revenue} for traffic types impacted by the offer.

* * * * *